(12) United States Patent
Caccavale

(10) Patent No.: US 7,962,914 B2
(45) Date of Patent: Jun. 14, 2011

(54) METHOD AND APPARATUS FOR LOAD BALANCING OF DISTRIBUTED PROCESSING UNITS BASED ON PERFORMANCE METRICS

(75) Inventor: Frank S Caccavale, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 2329 days.

(21) Appl. No.: 10/722,146

(22) Filed: Nov. 25, 2003

(65) Prior Publication Data

US 2005/0114429 A1    May 26, 2005

(51) Int. Cl.
- G06F 9/46 (2006.01)
- G06F 15/173 (2006.01)
- G06F 11/00 (2006.01)

(52) U.S. Cl. .......................... 718/104; 709/226; 726/24
(58) Field of Classification Search ................. 718/104; 709/226

See application file for complete search history.

(56) References Cited

U.S. PATENT DOCUMENTS

| | | | |
|---|---|---|---|
| 5,257,381 A | 10/1993 | Cook | 395/700 |
| 5,367,698 A | 11/1994 | Webber et al. | 395/800 |
| 5,459,837 A | 10/1995 | Caccavale | 395/184.01 |
| 5,475,839 A | 12/1995 | Watson et al. | 395/650 |
| 5,664,106 A | 9/1997 | Caccavale | 395/200.54 |
| 5,732,240 A | 3/1998 | Caccavale | 395/445 |
| 5,742,819 A | 4/1998 | Caccavale | 395/616 |
| 5,774,660 A | 6/1998 | Brendel et al. | 395/200.31 |
| 5,774,668 A * | 6/1998 | Choquier et al. | 709/223 |
| 5,835,756 A | 11/1998 | Caccavale | 395/601 |
| 5,884,038 A * | 3/1999 | Kapoor | 709/226 |
| 5,892,937 A | 4/1999 | Caccavale | 395/462 |
| 5,893,140 A | 4/1999 | Vahalia et al. | 711/118 |
| 5,918,008 A | 6/1999 | Togawa et al. | 395/186 |
| 6,088,803 A | 7/2000 | Tso et al. | 713/201 |
| 6,115,807 A * | 9/2000 | Grochowski | 712/212 |
| 6,223,205 B1 | 4/2001 | Harchol-Balter et al. | 709/105 |
| 6,230,200 B1 | 5/2001 | Forecast et al. | 709/226 |
| 6,434,637 B1 | 8/2002 | D'Errico | 710/38 |
| 6,438,595 B1 | 8/2002 | Blumenau et al. | 709/226 |
| 6,574,667 B1 | 6/2003 | Blumenau et al. | 709/229 |
| 6,622,221 B1 | 9/2003 | Zahavi | 711/154 |
| 7,003,564 B2 * | 2/2006 | Greuel et al. | 709/224 |
| 7,032,037 B2 * | 4/2006 | Garnett et al. | 710/2 |
| 7,203,944 B1 * | 4/2007 | van Rietschote et al. | 718/104 |
| 7,487,243 B1 * | 2/2009 | Zielinski et al. | 709/226 |
| 7,747,777 B2 * | 6/2010 | Previdi et al. | 709/241 |

(Continued)

OTHER PUBLICATIONS

Celerra File Server in the E-Infostructure, EMC Corporation, 176 South Street, Hopkinton, MA 01748, 2000, 12 pages.

(Continued)

Primary Examiner — Emerson C Puente
Assistant Examiner — Camquy Truong
(74) Attorney, Agent, or Firm — Richard Auchterlonie; Novak Druce & Quigg LLP

(57) ABSTRACT

Performance parameters are obtained for distributed processing units. The performance parameters include a utilization value, of each distributed processing unit. Respective weights are obtained for the distributed processing units by applying a mapping function to the utilization values. The respective weights are used for weighted round-robin load balancing of work requests upon the distributed processing units. In one implementation, a set of utilization values of the processing units are collected in response to a periodic heartbeat signal, a set of weights are produced from the set of utilization values, a distribution list is produced from the set of weights, and the distribution list is randomized repetitively for re-use during the heartbeat interval.

10 Claims, 15 Drawing Sheets

U.S. PATENT DOCUMENTS

| | | | |
|---|---|---|---|
| 2002/0034190 A1* | 3/2002 | Baratz et al. | 370/450 |
| 2002/0129277 A1* | 9/2002 | Caccavale | 713/201 |
| 2003/0105903 A1* | 6/2003 | Garnett et al. | 710/300 |
| 2003/0187711 A1* | 10/2003 | Komai | 705/8 |

OTHER PUBLICATIONS

Graphical Management of Celerra Network Server for the Microsoft Administrator, EMC Corporation, 176 South Street, Hopkinton, MA 01748, May 18, 2003, 20 pages.

Frank S. Caccavale, Sridhar C. Villapakkam, and Skye W. Spear, "Method and Apparatus Providing Centralized Analysis of Distributed System Performance Metrics," U.S. Appl. No. 10/441,866, filed May 20, 2003.

John Phillips, "Antivirus Scanning Best Practices Guide," [TR3107], Network Appliance, Inc. 495 East Java Drive, Sunnyvale, CA 94089, pp. 1-6; dated at least as early as Apr. 12, 2001.

John Phillips, "Antivirus Scanning Best Practices Guide," [TR3107], Network Appliance, Inc. 495 East Java Drive, Sunnyvale, CA 94089, pp. 1-13; dated at least as early as Sep. 12, 2003.

Gerald Foster, *"Desktop Management with Novell ZENworks"*, Chapter 3, "The Netware Clients and Related Components,"1st Ed. Apr. 2000, O'Reilly & Associates, Inc., oreilly.com, 30 pages.

NT Exam Issues, *"NT Server & Workstation (Exams 70-067 & -073) Issues"* by Ken ftq.com, 17 pages, Feb. 12, 2001.

*Microsoft Press Computer Dictionary*, 3rd eEd., Microsoft Press, a division of Microsoft Corporation, Redmond, Washington, 1997, p. 500.

*Enclyclopedia of Computer Science*, Third Edition, 1995 International Thomson Computer Press, Boston, MA, pp. 329-330.

*Network Anti-Virus Solutions (Info World)*, Aug. 10, 1998 (vol. 20, Issue 32) pp. 1-22, Appearing at archive.infoworld.com, version printed Feb. 23, 2001.

"System Event Notification Services and WMI Enable Flexible, Efficient Mobile Network Computing;" *MSDN Magazine*, Microsoft Corporation, Aug. 2002.

Szabo, Bruce, "Using WMI for Inventory Management;" ServerWatch.com, Jun. 4, 2001.

"NDIS WMI Notes;" NDIS.com; Printed Apr. 7, 2003.

"Triggers;" Databases with Mike Chapple; published at databases.about.com at least as early as Apr. 4, 2003.

Koopmann, James, "Implications of Setting Oracle9iR2's Statistics Collection Level;" DatabaseJounal.com; Apr. 2, 2003.

Weinstein, Eric W., "Metric;" Eric Weinstein's World of Mathematics, mathworld.wolfram.com;, CRC Press LLC; Wolfram Research, Inc. 2003.

Weinstein, Eric W., "Metric Entropy;" Eric Weinstein's World of Mathematics, mathworld.wolfram.com; CRC Press LLC; Wolfram Research, Inc., 2003.

Hillman, Chris, "Entropy in Ergodic Theory and Dynamical Systems;" math.psu.edu, May 7, 2001.

Ward, T., "Entropy of Compact Group Automorphisms;" *Lecture Notes; University of East Anglia*, Norwich, Norfolk; mth.uea.ac.uk, 2001.

Kenney, John F., Mathematics of Statistics, 1941, pp. 21-22, D. Van Nostrand Company, Inc., Boston, MA.

Burington, Richard S., Handbook of Mathematical Tables and Formulas, 1965, pp. 119-120, McGraw-Hill Book Company, New York, NY.

Kaplan, Steven M., Wiley Electrical and Electronics Engineering Dictionary, 2004, p. 306, IEEE Press, John Wiley & Sons, Inc., Hoboken, NJ.

Eaton, John W., et al., GNU Octave Manual Version 3, Sec. 16.3 Applying a Function to an Array, Aug. 2008, one page, Network Theory Limited, Surrey, England.

Mapping over lists— apply a function to each element of a list, web page, downloaded Mar. 1, 1010, 3 pages, Department of Mathematics, University of Illinois at Urbana-Champaign, IL.

Sekhon, Jas, Apply a Function over a List or Vector, web page, downloaded Mar. 2, 2010, 3 pages, University of California, Berkeley, CA.

* cited by examiner

| INDEX | RT | NR |
|---|---|---|
| 0 | 64 | |
| 1 | 65 | |
| 2 | 66 | |
| 3 | 67 | |
| ... | ... | ... |
| 29 | 93 | |
| 30 | 62 | |
| 31 | 63 | |
↗ 100
FIG. 6
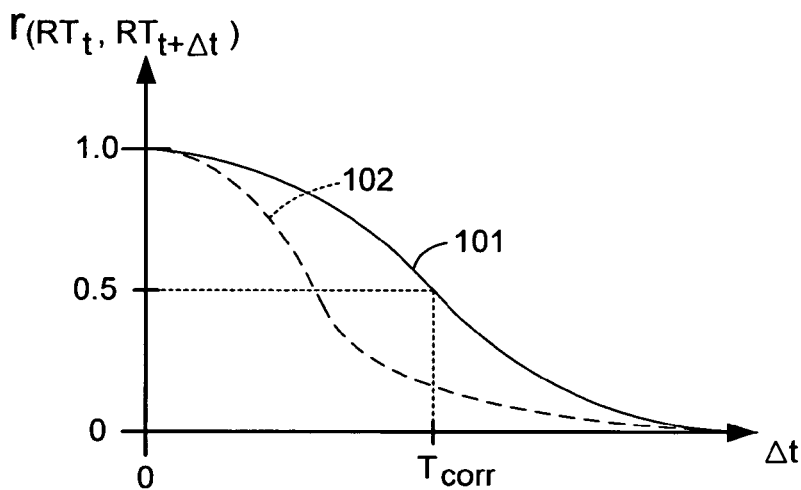
FIG. 7
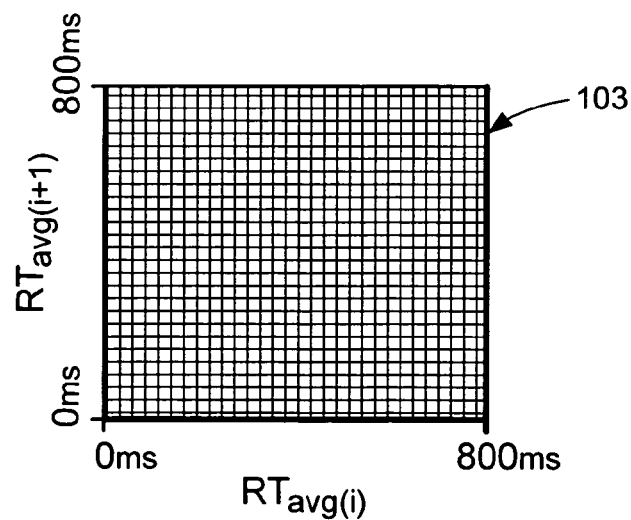
FIG. 8

METHOD AND APPARATUS FOR LOAD BALANCING OF DISTRIBUTED PROCESSING UNITS BASED ON PERFORMANCE METRICS

BACKGROUND OF THE INVENTION

1. Limited Copyright Waiver

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

2. Field of the Invention

The present invention relates generally to data processing networks, and more particularly to the load balancing of distributed processing units based on performance metrics.

3. Description of Related Art

It is often advantageous to distribute data processing tasks among a multiplicity of data processing units in a data processing network. The availability of more than one data processing unit provides redundancy for protection against processor failure. Data processing units can be added if and when needed to accommodate future demand. Individual data processing units can be replaced or upgraded with minimal disruption to ongoing data processing operations.

In a network providing distributed data processing, it is desirable to monitor distributed system performance. The performance of particular data processing units can be taken into consideration when configuring the network. Distributed performance can also be monitored to detect failures and system overload conditions. It is desired to reduce system overload conditions without the cost of additional data processing units.

SUMMARY OF THE INVENTION

In accordance with a first aspect, the invention provides a method of operation in a data processing network including distributed processing units. The method includes obtaining a respective utilization value of each distributed processing unit, applying a mapping function to the respective utilization value of each distributed processing unit to obtain a respective weight for each distributed processing unit, and using the respective weights for the distributed processing units for distributing work requests to the distributed processing units so that the respective weight for each distributed processing unit specifies a respective frequency at which the work requests are distributed to the distributed processing unit.

In accordance with another aspect, the invention provides a method of operation in a data processing network including distributed processing units. The method includes obtaining a respective utilization value of each distributed processing unit, applying a mapping function to the respective utilization value of each distributed processing unit to obtain a respective weight for each distributed processing unit, using the respective weights for the distributed processing units for producing a distribution list for distributing work requests to the distributed processing units for load balancing of the work requests upon the processing units, and repetitively randomizing the distribution list during the distribution of the work requests to the distributed processing units.

In accordance with yet another aspect, the invention provides a method of operation in a data processing network including a network file server and a plurality of virus checking servers. The method includes the network file server obtaining a respective utilization value of each virus checking server, the respective utilization value indicating a percentage of saturation of each virus checking server. The method further includes the network file server applying a mapping function to the respective utilization value to obtain a respective weight for each virus checking server, and the network file server using the respective weights for the virus checking servers for weighted round-robin load balancing of virus checking requests from the network file server to the virus checking servers.

In accordance with still another aspect, the invention provides a data processing system including distributed processing units and a processor coupled to the distributed processing units for distributing work requests to the distributed processing units. The processor is programmed for obtaining a respective utilization value of each distributed processing unit, applying a mapping function to the respective utilization value of each distributed processing unit to obtain a respective weight for each distributed processing unit, and using the respective weights for the distributed processing units for distributing work requests to the distributed processing units so that the respective weight for each distributed processing unit specifies a respective frequency at which the work requests are distributed to the distributed processing unit.

In accordance with yet another aspect, the invention provides a data processing system including distributed processing units and a processor coupled to the distributed processing units for distributing work requests to the distributed processing units. The processor is programmed for obtaining a respective utilization value of each distributed processing unit, applying a mapping function to the respective utilization value of each distributed processing unit to obtain a respective weight for each distributed processing unit, using the respective weights for the distributed processing units for producing a distribution list for distributing work requests to the distributed processing units for load balancing of the work requests upon the processing units, and repetitively randomizing the distribution list during the distribution of the work requests to the distributed processing units.

In accordance with a final aspect, the invention provides a data processing system including virus checking servers and a network file server coupled to the virus checking servers for distributing virus checking requests to the virus checking servers. The network file server is programmed for obtaining a respective utilization value of each virus checking server, the respective utilization value indicating a percentage of saturation of each virus checking server, applying a mapping function to the respective utilization value to obtain a respective weight for each virus checking server, and using the respective weights for the virus checking servers for weighted round-robin load balancing of virus checking requests from the network file server to the virus checking servers.

BRIEF DESCRIPTION OF THE DRAWINGS

Other objects and advantages of the invention will become apparent upon reading the detailed description with reference to the drawings, in which:

FIG. 6 shows a format that the event monitor could user for recording statistics in a database in a file in the server of FIG. 4;

FIG. 7 is a graph of auto-correlation of server response time;

FIG. 8 shows a phase space of server response time;

Figure 1:
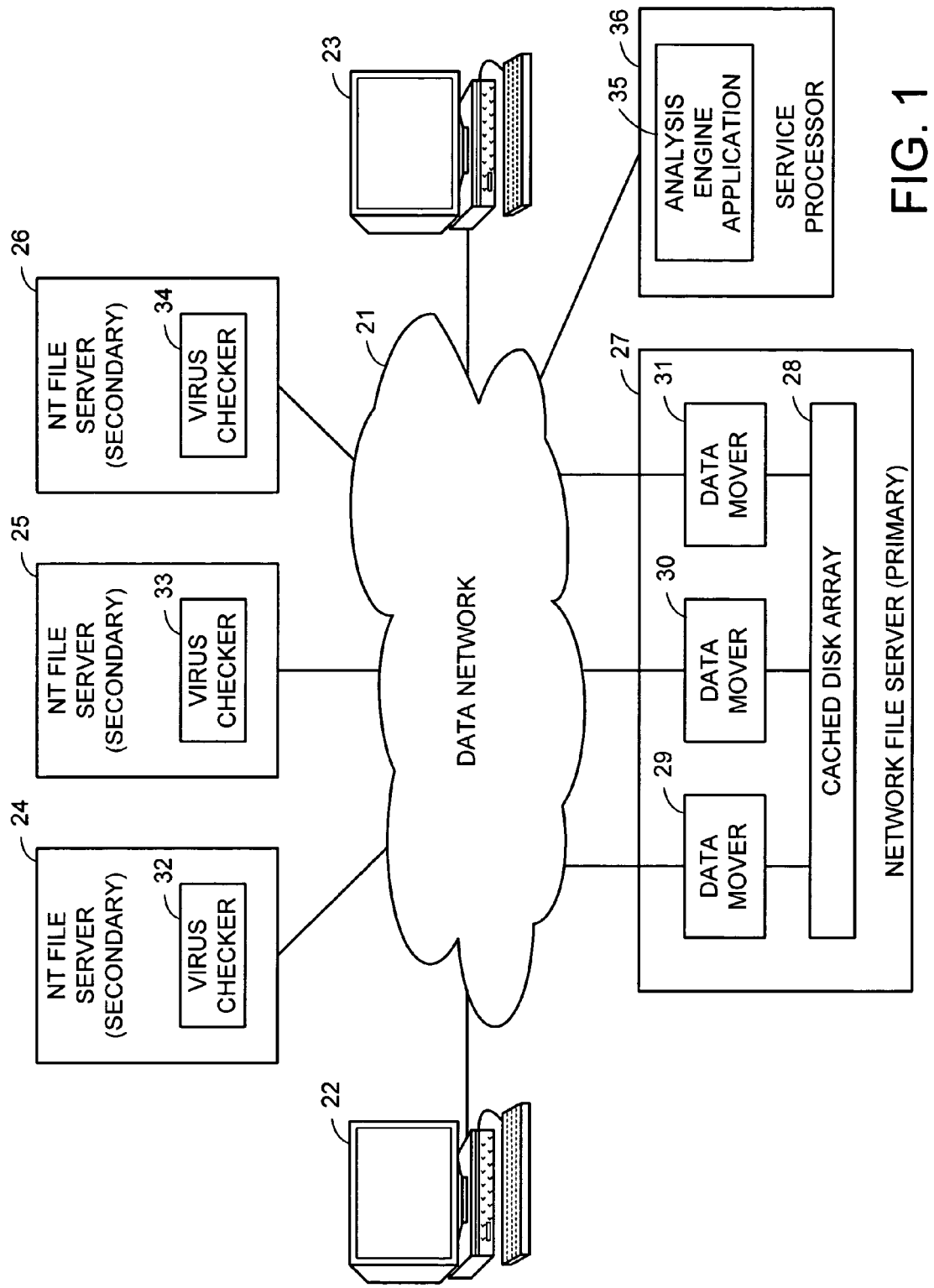
FIG. 1 is a block diagram of a data processing system incorporating the present invention for load balancing of virus checkers.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

Collection of Performance Parameters from Distributed Processing Units

With reference to FIG. 1, there is shown a distributed data processing system incorporating the present invention for load balancing of distributed processing units. The data processing system includes a data network 21 interconnecting a number of clients and servers. The data network 21 may include any one or more of network connection technologies, such as Ethernet or Fibre Channel, and communication protocols, such as TCP/IP or UDP. The clients include work stations 22 and 23. The work stations, for example, are personal computers. The servers include conventional Windows NT/2000 file servers 24, 25, 26, and a very large capacity network file server 27. The network file server 27 functions as a primary server storing files in nonvolatile memory. The NT file servers 24, 25, 26 serve as secondary servers performing virus checking upon file data obtained from the network file server 27. The network file server 27 is further described in Vahalia et al., U.S. Pat. No. 5,893,140 issued Apr. 6, 1999, incorporated herein by reference. Such a very large capacity network file server 27 is manufactured and sold by EMC Corporation, 176 South Street, Hopkinton, Mass. 01748.

The network file server 27 includes a cached disk array 28 and a number of data movers 29, 30 and 31. The network file server 27 is managed as a dedicated network appliance, integrated with popular network operating systems in a way, which, other than its superior performance, is transparent to the end user. The clustering of the data movers 29, 30, 31 as a front end to the cached disk array 28 provides parallelism and scalability. Each of the data movers 29, 30, 31 is a high-end commodity computer, providing the highest performance appropriate for a data mover at the lowest cost.

Each of the NT file servers 24, 25, 26 is programmed with a respective conventional virus checker 32, 33, 34. The virus checkers are enterprise class anti-virus engines, such as the NAI/McAfee's NetShield 4.5 for NT Server, Symantec Norton AntiVirus 7.5 Corporate Edition for Windows NT, Trend Micro's ServerProtect 5.5 for Windows NT Server. In each of the NT file servers 24, 25, 26, the virus checker 32, 33, 34 is invoked to scan a file in the file server in response to certain file access operations. For example, when the file is opened for a user, the file is scanned prior to user access, and when the file is closed, the file is scanned before permitting any other user to access the file.

The network file server 27, however, is not programmed with a conventional virus checker, because a conventional virus checker needs to run in the environment of a conventional operating system. Network administrators, who are the purchasers of the file servers, would like the network file server 27 to have a virus checking capability similar to the virus checking provided in the conventional NT file servers 24, 25, 26. Although a conventional virus checker could be modified to run in the environment of the data mover operating system, or the data mover operating system could be modified to support a conventional virus checker, it is advantageous for the network file server 27 to use the virus checkers 27, 28, 29 in the NT file servers to check files in the network file server 27 in response to user access of the files in the network file server. This avoids the difficulties of porting a conventional virus checker to the network file server, and maintaining a conventional virus checker in the data mover environment of the network file server. Moreover, in many cases, the high-capacity network file server 27 is added to an existing data processing system that already includes one or more NT file servers including conventional virus checkers. In such a system, all of the files in the NT file servers 24, 25, 26 can be migrated to the high-capacity network file server 27 in order to facilitate storage management. The NT file servers 24, 25, 26 in effect become obsolete for data storage, yet they can still serve a useful function by providing virus checking services to the network file server 27.

In general, when a client 22, 23 stores or modifies a file in the network file server 27, the network file server determines when the file needs to be scanned. When anti-virus scanning of a file has begun, other clients are blocked on any access to that file, until the scan completes on the file. The network file server 27 selects a particular one of the NT file servers 24, 25, 26 to perform the scan, in order to balance loading upon the NT file servers for anti-virus scanning processes. The virus checker in the selected NT file server performs a read-only access of the file to transfer file data from the network file server to random access memory in the selected NT file server in order to perform the anti-virus scan in the NT file server. Further details regarding the construction and operation of the virus checkers 32, 33, 34 and the interface between the virus checkers and the network file server 27 are found in Caccavale U.S. patent application Publication No. 2002/0129277 A1 published Sep. 12, 2002, incorporated herein by reference.

In the system of FIG. 1, the NT file servers function as distributed processing units for processing of anti-virus scans. It is desirable to determine a measure of system performance, and trigger an alarm when the measure of system performance indicates a presence of system degradation. For this purpose, the system includes a service processor 36 programmed with an analysis engine application for collecting performance parameters from the NT file servers, and for performing an analysis of these performance parameters. The service processor 36 could be a processor in any one of the client terminals 22, 23 or the file servers 24, 25, 26, and 27 in the system of FIG. 1. For example, the service processor could be the processor of the client terminal of a system administrator for the system of FIG. 1. It is also desirable to perform load balancing upon the NT file servers based on the performance parameters from the NT file servers, as will be further described below with reference to FIGS. 14 to 18.

Figure 2:
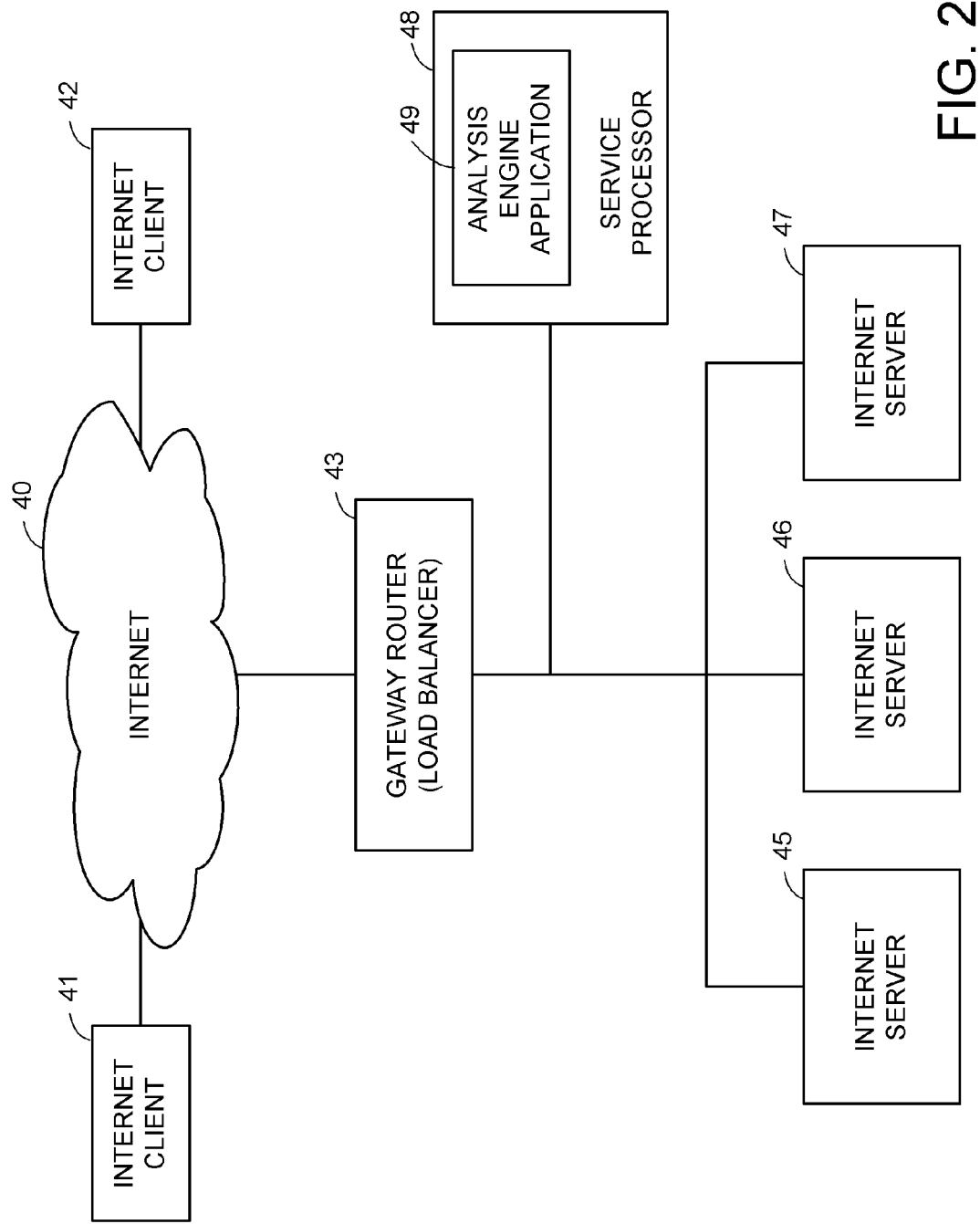
FIG. 2 is a block diagram of an Internet site incorporating the present invention for load balancing of Internet servers.

With reference to FIG. 2, there is shown another example of a data processing system in which the present invention can be used. FIG. 2 shows the Internet 40 connecting clients 41 and 42 to a gateway router 43 of an Internet site. The Internet site includes Internet servers 45, 46, and 47 and a service processor 48 programmed with an analysis engine application 49. In this example, the gateway router 43 receives client requests for access to a "web page" at the Internet address of the gateway router. The gateway router 43 performs load balancing by routing each client request to a selected one of the Internet servers 45, 46, and 47. The Internet servers function as distributed data processing units. The analysis engine application 49 collects performance parameters from the Internet servers 45, 46, and 47 in order to determine a measure of system performance, and to trigger an alarm when the measure of system performance indicates a presence of system degradation. The analysis engine application 49 in the system of FIG. 2 operates in a fashion similar to the analysis engine application 35 and FIG. 1. The performance parameters can also be used to perform load balancing upon the Internet servers 45, 46, and 47, in a fashion similar to the load balancing described below with reference to FIGS. 14 to 18.

Figure 3:
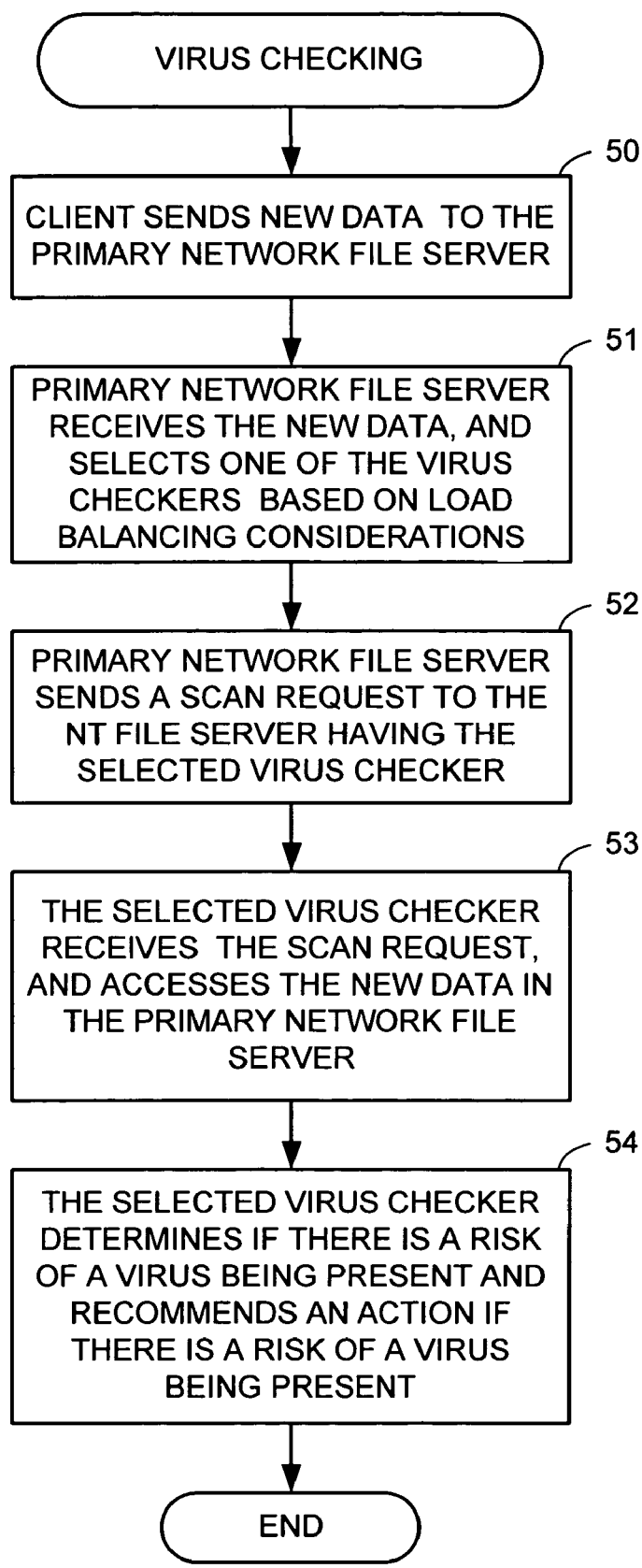
FIG. 3 is a flowchart of a method of using a virus checker in the system of FIG. 1.

With reference to FIG. 3, there is shown a flowchart of a method of using a virus checker in the system of FIG. 1. In a first step 50 of FIG. 3, a client (22, 23 in FIG. 1) sends new data to the primary network file server (27 in FIG. 1). Next, in step 51, the primary network file server receives the new data, and selects one of the virus checkers for load balancing. For example, a virus checker is selected using a "round robin" method that places substantially the same workload upon each of the virus checkers. In step 52, the primary network file server sends an anti-virus scan request to the NT file server (24, 25, or 26 in FIG. 1) having the selected virus checker (32, 33, or 34). The scan request identifies the new data to be scanned. In step 53, the selected virus checker receives the scan request, and accesses the new data in the primary network file server. In step 54, the selected virus checker determines if there is a risk of a virus being present in the new data, and recommends an action if there is a risk of a virus being present.

Figure 4:
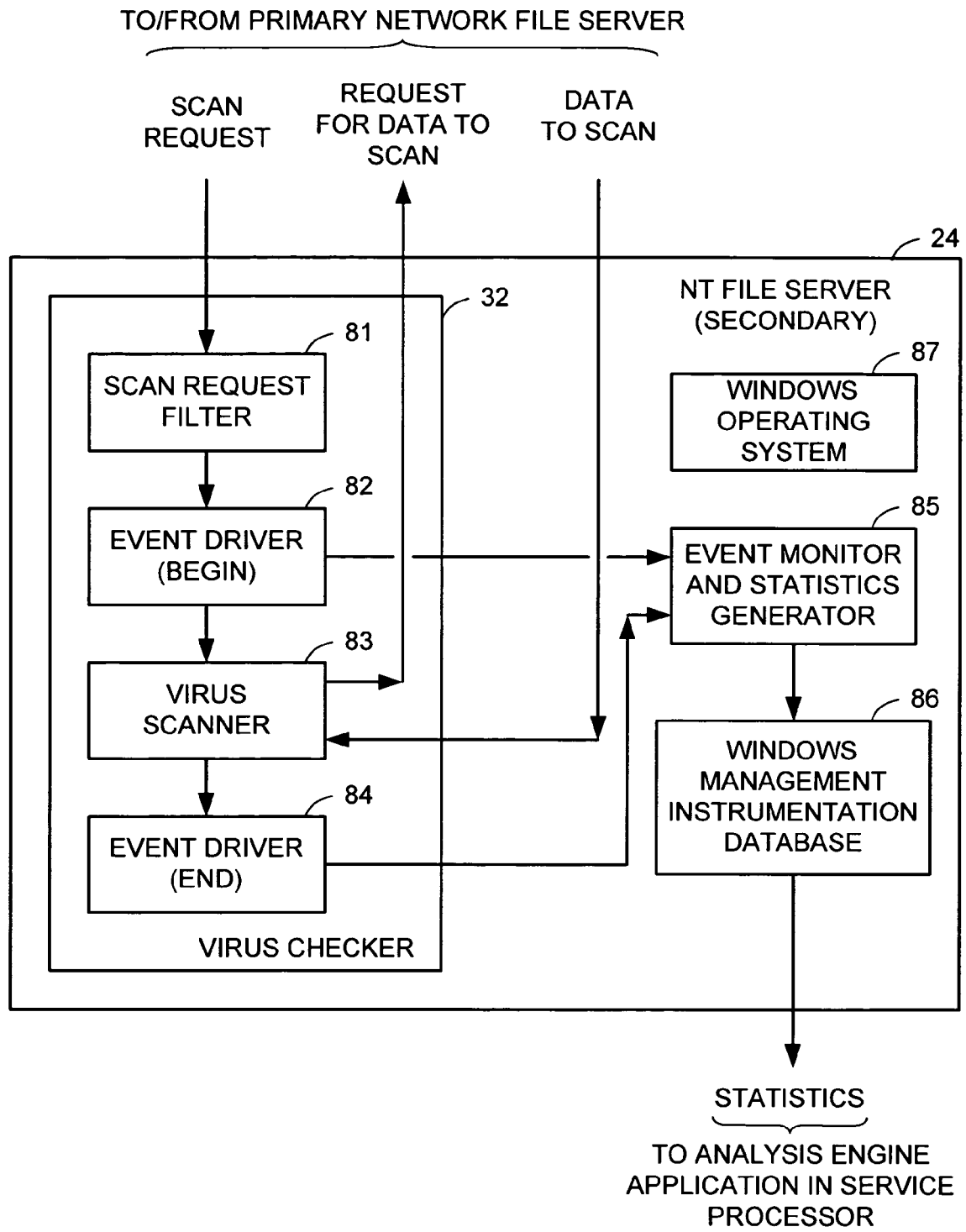
FIG. 4 is a block diagram showing details of a virus checker and an event monitor in a server in the system of FIG. 1.

FIG. 4 shows details of a virus checker 32 and an event monitor 85 in an NT server 24 in the system of FIG. 1. A scan request filter 81 receives a scan request from the primary network file server (27 in FIG. 1). The scan request filter 81 determines if the virus checker will accept the request. Once a request is accepted, the scan request filter 81 passes the request to an event driver 82. The event driver 82 sends a "begin" event signal to an event monitor and statistics generator 85, which is an application program in the NT file server 24. The event monitor and statistics generator 85 responds to the "begin" event signal by recording the time of acceptance of the scan request. The event driver 82 passes the scan request to a virus scanner 83.

The virus scanner 83 obtains the new data from the primary network file server (27 in FIG. 1) and scans that data for potential virus contamination. Upon completion of the scan of the data, the results are passed to an event driver 84. The event driver 84 sends an "end" event signal to the event monitor and statistics generator 85. The event driver 82 and the event driver 84 may use a common interface routine in the virus checker 32, in order to interface with the event monitor and statistics generator 85. After the event driver 84 sends the "end" event signal to the event monitor and statistics generator 85, the virus checker 32 returns an acknowledgement to the primary network file server indicating the result of completion of the anti-virus scan.

The event monitor and statistics generator 85 responds to the "end" event signal by obtaining the time of the "end" event and computing the duration of time between the corresponding "begin" event and the "end" event. Moreover, during each test interval (denoted as $T_i$), all response times are stored and an average is taken. The average response time for the test interval, and the total number of scan requests processed by the virus scanner 83 during the test interval, are stored in the "Windows Management Instrumentation" (WMI) data base 86 maintained by the Microsoft Corporation WINDOWS operating system 87 of the NT file server 24. After storage of the average response time and the total number of scan requests, a new test interval is started and new response times are stored for use in the next average response time generation. For example, the default setting for the test interval is 10 seconds, and the number of consecutive test interval results stored in the WMI database is 30 or greater.

The use of the event monitor 85 in the NT file server 24 to compute and store averages of the response time over the test intervals reduces the total data set that need be analyzed. Therefore, the storage of the data in the WMI 86 is more compact, network resources are conserved when the analysis engine accesses the WMI, and processing requirements of the analysis engine are reduced. The use of the WMI as an interface between the event monitor and the analysis engine ensures that the event monitor 85 need not know anything about the protocol used by the analysis engine to access the WMI. The WMI provides a standard data storage object and internal and external access protocols that are available whenever the Windows operating system 87 is up and running.

Figure 5:
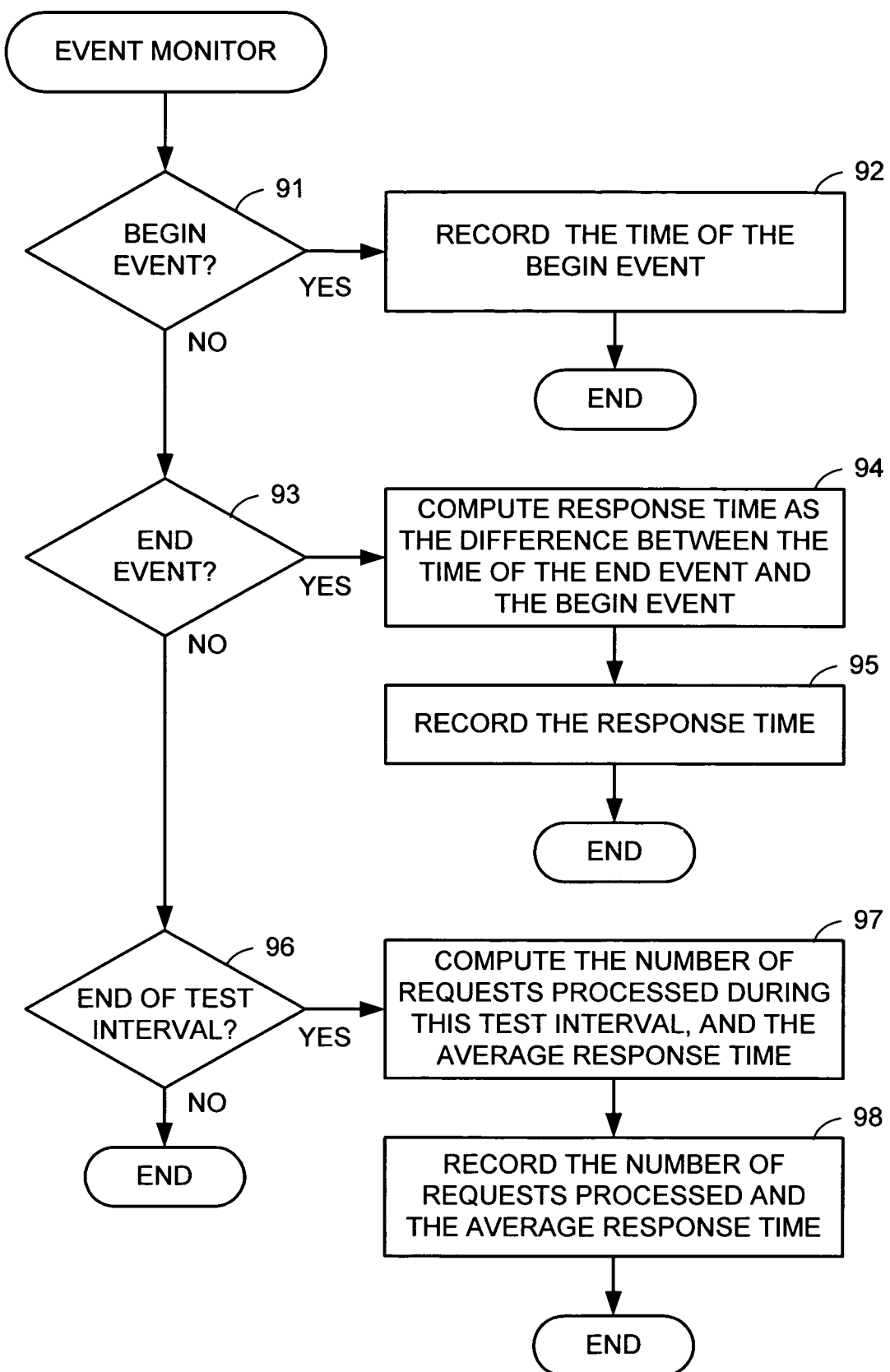
FIG. 5 is a flowchart of the operation of the event monitor

FIG. 5 is a flowchart of the operation of the event monitor and statistics generator (85 in FIG. 4). In a first step 91, in response to a "begin" event, execution branches to step 92. In step 92, the event monitor records the time of the "begin" event for the scan, and processing for the "begin" event is finished. If the event monitor is responding to something other than a "begin" event, execution continues from step 91 to step 93.

In step 93, in response to an "end" event, execution branches from step 93 to step 94. In step 94, the event monitor computes the response time for the scan as the difference between the time of the end event and the time of the begin event. Then in step 95, the event monitor records the response time for the scan, and processing for the "end" event is finished. If the event monitor is responding to something other than a "begin" event or an "end" event, execution continues from step 93 to step 96.

In step 96, in response to the end of a test interval, execution branches from step 96 to step 97. In step 97, the event monitor computes the number of requests processed during this test interval, and the average response time. The average response time is computed as the sum of the response times recorded in step 95 during this test interval, divided by the number of requests processed during this test interval. Then in step 98, the event monitor records the number of requests processed during this test interval, and the average response time. After step 98, processing is finished for the end of the test interval.

In the procedure of FIG. 5, the processing of a request may begin in one test interval and be completed in a following test interval. In this situation, the number of requests processed (NR) for a particular test interval indicates the number of requests completed in that test interval. Also, it is possible for a "running sum" of the response times and a "running sum" of the number of requests processed to be accumulated and recorded in step 95, instead of simply recording the response time in step 95. In this case, the running sum of the number of requests processed will be the total number of requests completed over the ending test interval when step 97 is reached, and the average response time for the ending test interval can be computed in step 97 by dividing the running sum of the response times by this total number of requests completed over the ending test interval. Then in step 98, after recording the number of requests processed and the average response time, the running sum of the response times and the running sum of the number of requests processed can be cleared for accumulation of the response times and the number of requests processed during the next test interval.

FIG. 6 shows a format that the event monitor could user for recording statistics in a database stored in a file in the server of FIG. 4. The database is in the form of an array or table 100. For example, the table 100 includes thirty-two rows. Included in each row is an index, the response time (RT), and the number of requests processed (NR) for the test interval indicated by the index. The index is incremented each time a new row of data is written to the table 100. The row number of the table is specified by the least significant five bits of the index. The last time a row of data was written to the table can be determined by searching the table to find the row having the maximum value for the index. This row will usually contain the row of data that was last written to the table, unless the maximum value for the index is its maximum possible value and it is followed by a row having an index of zero, indicating "roll-over" of the index has occurred. If "roll-over" has occurred, then the last time a row of data was written to the table occurred for the row having the largest index that is less than 32. By reading the table 100 in a server, the analysis engine application in the service processor can determine the index for the most recent test interval and copy the data from a certain number (N) of the rows for the most recent test intervals into a local array in the service processor.

In a preferred implementation, Microsoft WMI services are used to define a data structure for the statistics in the WMI database (86 in FIG. 4), to put new values for the statistics into the data structure, and to retrieve the new values of the statistics from the data structure. In general, WMI is a Microsoft Corporation implementation of WBEM. WBEM is an open initiative that specifies how components can provide unified enterprise management. WBEM is a set of standards that use the Common Information Model (CIM) for defining data, xmlCIM for encoding data, and CIM over Hyper-Text Transmission Protocol (HTTP) for transporting data. An application in a data processing unit uses a WMI driver to define a data structure in the is WMI database and to put data into that data structure in the WMI database. User-mode WMI clients can access the data in the WMI database by using WMI Query language (WQL). WQL is based on ANSI Standard Query Language (SQL).

In the preferred implementation, the data structure in the WMI database stores the total files scanned (NR) by the virus checker, the average response time (RT) per scan, the saturation level for the average response time per scan, state information of the virus checker, and state information of the event monitor and statistics generator. A WMI provider dll sets and gets data to and from the WMI database.

The following is an example of how the WMI provider dll is used to put data into the WMI database:

```
STDMETHODIMP CCAVAProvider::PutProperty(   long lFlags,
                                           const BSTR Locale,
                                           const BSTR InstMapping,
                                           const BSTR PropMapping,
                                           Const VARIANT
                                           *pvValue)
{
        if(!_wcsicmp(PropMapping, L"ScansPerSec"))
        {
             m_dScansPerSec = pvValue->dblVal;
        }
}
```

The following is an example of how the WMI provider dll is used to get data from the WMI database:

```
STDMETHODIMP CCAVAProvider::GetProperty( long lFlags,
                                         const BSTR Locale,
                                         const BSTR InstMapping,
                                         const BSTR PropMapping,
                                         VARIANT *pvValue)
{
        if(!_wcsicmp(PropMapping, L"ScansPerSec"))
        {                          {
             pvValue->vt = VT_R8;
             pvValue->dblVal = m_dScansPerSec;
        }
        return sc;
}                                  }
```

The following is an example of how the event monitor sets its processed results in the WMI database via the provider dll for transmission to the analysis engine:

```
// this object will time the scan
CScanWatcher* pSW = new CScanWatcher;
// this is the scan of the file
VC_Status s = m_pVAgent->CheckFile(csFileName);
// the sectructor of the object completes the calculations
and records the scan stats
   delete pSW;
```

The following is an example of how the analysis engine (e.g., a Visual Basic GUI application) may use the WMI provider dll to retrieve the statistics from the WMI database and present the statistics to a user:

```
Dim CAVA As SWbemObject
Dim CAVASet As SWbemObjectSet
Dim CurrentCAVA As SWbemObject
Dim strServer As String
Dim strE
        Open ".\cavamon.dat" For Input As #1    'open dat file
        lstStatsOutput.Clear                    'clear output
        Do While Not EOF(1) ' for each machine in cavamon.dat
             Input #1, strServer
             If strServer = "" Then
                  GoTo NextLoop
```

-continued

```
        Else
            On Error GoTo ErrorHandler
        End If
    'Debug.Print strServer
    Set Namespace = GetObject("winmgmts://" & strServer &
"/root/emc")
        'this will trap a junk server name
        If Err.Number <> 0 Then GoTo NextLoop
        Set CAVASet = Namespace.InstancesOf("CAVA")
        For Each CAVA In CAVASet     ' for each cava in a given machine
                                     ' DISPLAY EACH CAVA'S WMI
                                     INFO
                                     'Set         CurrentCAVA     =
GetObject("winmgmts:" & CAVA.Path_.RelPath)
            lstStatsOutput.AddItem ("Server: \\" & strServer & "\")
            lstStatsOutput.AddItem ("---Cumulative Statistics---")
            If Not IsNull(CAVA.AVEngineState) Then
                lstStatsOutput.AddItem      ("AV Engine State: " &
CAVA.AVEngineState)
            End If
            If Not IsNull(CAVA.AVEngineType) Then
                lstStatsOutput.AddItem      ("AV Engine Type: " &
CAVA.AVEngineType)
            End If
            If Not IsNull(CAVA.FilesScanned) Then
                lstStatsOutput.AddItem    ("Total Files Scanned: " &
CAVA.FilesScanned)
            End If
            lstStatsOutput.AddItem ("---Interval Statistics---")
            If Not IsNull(CAVA.Health) Then
                lstStatsOutput.AddItem ("      AV Health:    " &
CAVA.Health)
            End If
            If Not IsNull(CAVA.MilliSecsPerScan) Then
                lstStatsOutput.AddItem ("     Milliseconds per Scan: "
& FormatNumber(CAVA.MilliSecsPerScan, 2))
            End If
            If Not IsNull(CAVA.SaturationPercent) Then
                If CAVA.SaturationPercent = 0 Then
                    lstStatsOutput.AddItem ("     Saturation %: N/A")
                Else
                    lstStatsOutput.AddItem ("     Saturation %: " &
FormatNumber((CAVA.SaturationPercent * 100), 2))
                End If
            End If
            If Not IsNull(CAVA.ScansPerSec) Then
                lstStatsOutput.AddItem ("     Scans Per Second: " &
CAVA.ScansPerSec)
            End If
            If Not IsNull(CAVA.State) Then
                lstStatsOutput.AddItem ("         CAVA State: " &
CAVA.State)
            End If
            If Not IsNull(CAVA.Version) Then
                lstStatsOutput.AddItem ("        CAVA Version: " &
CAVA.Version)
            End If
            lstStatsOutput.AddItem ("")
        Next 'for each cava in a given machine
    NextLoop:
    Loop ' for each machine in cavamon.dat
    Close #1 'close opened file
    GoTo SuccessHandler
ErrorHandler:
    Close #1
    tmrStats.Enabled = False 'disable the timer
    cmdStats.Caption = "Get Stats" 'change button caption
    MsgBox "An error has occurred: " & Err.Description
SuccessHandler:
End Sub
```

In the analysis engine, the local array of statistics has the values ($RT_i$, $NR_i$) for i=0 to N-1. The value of N, for example is at least 30. The values of the local array are used to compute three measurements of the activity of the system. The measurements are (1) average response time; (2) metric entropy; and (3) utilization. These measurements indicate how well the system is working and can be used to estimate changes in the system that will improve performance.

The response times returned from each virus checker, $RT_{ij}$, are analyzed on a per virus checker basis. A maximum response time limit can be specified, and if any $RT_{ij}$ exceeds the specified maximum response time limit, then an alarm is posted identifying the (jth) virus checker having the excessive response time. A rat of change of each of the $RT_{ij}$ is also computed and accumulated per virus checker according to:

$$\Delta RT_{ij} = RT_{ij} \times RT_{(i-1)j}$$

If any virus checker exhibits exponential growth in the response time, as further described below with reference to FIG. 13, then an alarm is posted.

In order to reduce the overhead for computing, storing, and transporting the performance statistics over the network, it is desired for the test interval to include multiple scans, but the test interval should not have a duration that is so long that pertinent information would be lost from the statistics. For example, the computation of metric entropy, as described below, extracts information about a degree of correlation of the response times at adjacent test intervals. Degradation and disorder of the system is indicated when there is a decrease in this correlation. The duration of the test interval should not be so long that the response times at adjacent test intervals become substantially uncorrelated under normal conditions.

FIG. 7, for example, includes a graph of the auto-correlation coefficient (r) of the server response time RT. The auto-correlation coefficient is defined $$r = \frac{\text{cov}(RT_t, RT_{t+\Delta t})}{\sigma^2_{RT}}$$

The value of the auto-correlation coefficient of the server response time RT ranges from 1 at $\Delta t=0$ to zero at $\Delta t=\infty$. Of particular interest is the value of time ($T_{corr}$) at which the auto-correlation coefficient has a value of one-half. System degradation and disorder in the server response time causes the graph of the auto-correlation coefficient to shift from the solid line position 101 to the dashed line position 102 in FIG. 7. This shift causes a most noticeable change in the value of auto-correlation coefficient for a $\Delta t$ on the order of $T_{corr}$. Consequently, for extracting auto-correlation statistics or computing a metric entropy by using a two-dimensional phase space, as further described below, the test interval should be no greater than about $T_{corr}$.

The anti-virus scan tasks have the characteristic that each task requires substantially the same amount of data to be scanned. If the scan tasks did not inherently have this property, then each scan task could be broken down into sub-tasks each requiring substantially the same processing time under normal conditions, in order to apply the following analysis to the performance statistics of the sub-tasks. Alternatively, the performance statistics for each task could be normalized in terms of the processing time required for a certain number of server operations, such as scanning a megabyte of data.

If the response times of the virus checkers vary randomly over the possible ranges of response times, then the response time is becoming unpredictable and there is a problem with the system. Similarly, if there is normally a substantial degree of auto-correlation of the response time of each virus checker between adjacent test intervals but there is a loss of this degree of auto-correlation, then the response time is becoming unpredictable and there is a problem with the system. Assumptions about whether the system is properly configured to handle peak loads are likely to become incorrect. Load balancing methods may fail to respond to servers that experience a sudden loss in performance. In any event, gains in performance in one part of the system may no longer compensate for loss in performance in other parts of the system.

The unpredictability in the system can be expressed numerically in terms of a metric entropy. The adjective "metric" denotes that the metric entropy has a minimum value of zero for the case of zero disorder. For example, metric entropy for a sequence of bits has been defined by the following equation:

$$H_\mu = -\frac{1}{L}\sum_{i=1}^{n} p_i \log_2 p_i$$

where L is word length in the sequence, and p is the probability of occurrence for the i-th L-word in the sequence. This metric entropy is zero for constant sequences, increases monotonically when the disorder of the sequence increases, and reaches a maximum of 1 for equally distributed random sequences.

To compute a metric entropy for the entire system of virus checkers, the analysis engine retrieves the response time arrays from the WMI databases of the NT servers containing the virus checkers. These responses are averaged on a per interval basis. Calling the response time from anti-virus engine (j) in test interval (i) $Rt_{ij}$, the average is taken for across all of N anti-virus engines as:

$$RT_{avg(i)} = \left(\sum_{j=1}^{N} RT_{ij}\right) \bigg/ N$$

Thus, the symbol $RT_{avg(i)}$ indicates the average response time across the N anti-virus engines during the test interval (i).

Next a two-dimensional phase space is generated and cells in the phase space are populated based upon the adjacent pairs of values in the $RT_{avg(i)}$ table. FIG. 8 shows an example of such a phase space 103. The worst case response time (the saturation response time for the system of anti-virus engines) is divided by the resolution desired per axis in order to determine the number of cells per axis. An example would be if the saturation response were 800 ms (milliseconds) and the desired resolution per axis were 10 ms then each axis of the phase space would consist of 10 ms intervals for a duration of 80 intervals. This would give an 80 by 80 grid consisting of 6400 cells. The desired resolution per axis, for example, is selected to be no greater than the standard deviation of the average response time over the virus checkers for each test interval during normal operation of the system.

Each pair of adjacent values of $RT_{avg(i)}$ is analyzed to determine the location in the phase space that this pair would occupy. An example would be if two adjacent values were 47.3 ms and 98 ms. This would mean that on the first axis of the phase space the interval is the $5^{th}$ interval (i.e. from 40 ms to 50 ms) and the second axis is the $10^{th}$ interval (i.e. from 90 ms to 100 ms). This pair of values would represent an entry to the (5,10) cell location in the phase space. As pairs of values are analyzed the number of entries in each phase space cell location is incremented as entries are made.

The worst case metric entropy would occur if every cell location were Is entered with equal probability. The value of this worst case metric entropy is given by the formula:

$$-1 \times (\log_{10}(\text{worst case probability of random entry}))$$

In the example of an 80 by 80 interval phase space the worst case probability would be (1) out of (6400) so the value of the worst case metric entropy would be approximately 3.81. The best case metric entropy should be zero. This would indicate that all entries always have the same response time.

To approximate the metric entropy function the probabilities of the entries are put into the formula:

$$-\sum_{i=1}^{80}\sum_{j=1}^{80} \Pr_{ij}(\log_{10} \Pr_{ij})$$

In this formula $\Pr_{ij}$ is the probability of the $(ij)^{th}$ phase space cell location being hit by an entry based on the entries accumulated. Should all entries accumulate in a single phase space cell location then the probability of that cell location being hit is (1) and then log(1) is zero hence the approximated metric entropy is zero, the best case metric entropy. Should all entries be evenly dispersed across all possible phase space cell locations then the summation returns the probability of each phase space location as 1/(total number of phase space locations). Since there are the as many terms in the sum as there are phase space cell locations then sum becomes:

$$-1 \times (\text{phase space area}) \times (1/(\text{phase space area})) \times \log_{10}\Pr_{ij}$$

where the phase space area is the total number of cell locations in the phase space (6400 in the example given above). Since the $PR_{ij}$ is the worst case probability this becomes the same value as the worst case metric entropy. Therefore the metric entropy from this computation ranges from 0 to about 3.81. This matches, to a proportionality constant, the metric entropy as defined in the literature, which ranges from 0 to 1.

Although the metric entropy from this computation could be normalized to a maximum value of 1, there is no need for such a normalization, because the metric entropy from this computation is compared to a specified maximum limit to trigger an alarm signaling system degradation. Therefore, there is a reduction in the computational requirements compared to the computation of true metric entropy as defined in the literature. Computations are saved in the analysis engine so that the analysis engine can operate along with other applications without degrading performance.

Figure 9:
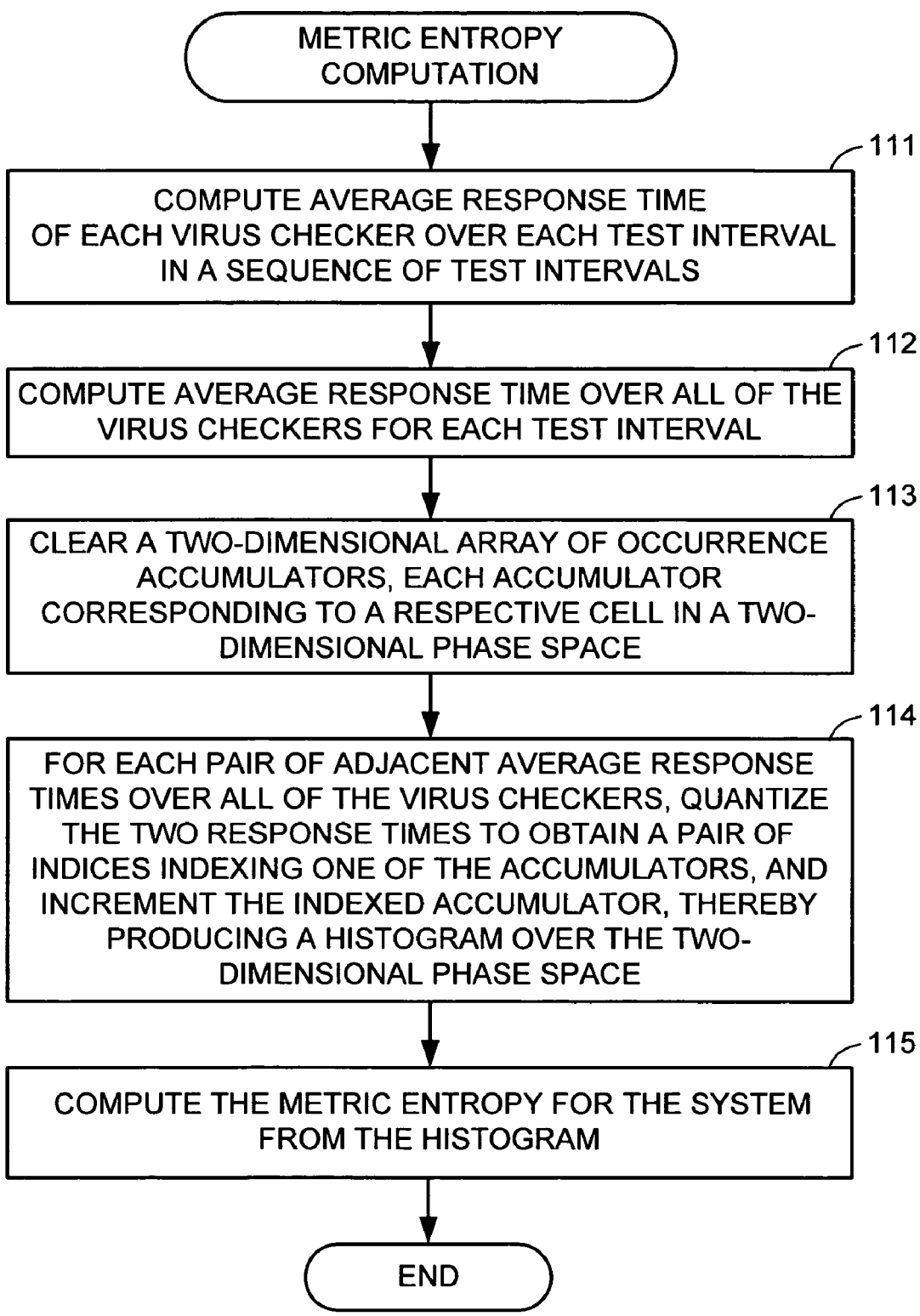
FIG. 9 is a flowchart of a procedure for determining metric entropy of virus checker performance.

FIG. 9 shows the steps introduced above for computing a metric entropy for the virus checker system of FIG. 1. In a first step 111, an average response time of each virus checker is computed over each test interval in a sequence of test intervals. For example, an event monitor in a server for each virus checker computes the average response time of each virus checker for each test interval. In step 112, the average response time over all of the virus checkers is computed for each test interval. For example, the analysis engine application computes the average response time over all of the virus checkers for each test interval.

In step 113, a two-dimensional array of occurrence accumulators is cleared. Each accumulator corresponds to a respective cell in the two-dimensional phase space. In step 114, for each pair of adjacent average response times over all of the virus. checkers, the two response times are quantized to obtain a pair of indices indexing one of the accumulators, and the indexed accumulator is incremented, thereby producing a histogram over the two-dimensional phase space. In step 115, the metric entropy for the system is computed from this histogram. For example, the analysis engine application performs steps 133, 114, and 115.

The value computed for the metric entropy is compared to a specified maximum limit. When the specified maximum limit is exceeded, an alarm is posted notifying that the behavior of the system is becoming erratic. The system can be investigated to determine if the load is being improperly distributed (possibly due to a malfunctioning virus checker or an improper configuration of the network).

As new values of metric entropy are accumulated a rate of change is calculated between adjacent time intervals according to:

$$\Delta H_i = H_{(i)} - H_{(i-1)}$$

The rate of change is checked for an exponential rate of increase. This rate of change can signal that there are changes occurring in the system that will lead to a problem. This measurement is a form of predictive analysis that can notify system users that a problem can be averted if action is taken.

The utilization of individual virus checkers is computed based on the data retrieved from the WMI database in each of the NT file servers. The data include the response time values ($RT_{ij}$) and the number of requests for scans ($NR_{ij}$) during the ($i_{th}$) test interval for the ($j_{th}$) virus checker. The interval duration ($\tau$) divided by the number of requests ($NR_{ij}$) yields the average time between requests. The reciprocal of the average time between requests is the request rate. The response time (i.e. $RT_{ij}$) divided by the average time between requests gives the utilization of that virus checker during that interval. Therefore, the utilization ($\alpha_{ij}$) of the ($j_{th}$) virus checker over the ($i_{th}$) test interval is computed as:

$$\alpha_{ij} = (RT_{ij})(NR_{ij})/(\tau)$$

A maximum limit (for example 60%) is set for virus checker utilization. If this maximum limit is exceeded for a virus checker then that virus checker is over utilized. A recommendation is made based on the virus checker utilization for corrective action. Should a single virus checker be over utilized then there is an imbalance in the system and the configuration should be corrected. Should all utilization values be high a recommendation is made on the number of virus checkers that should be added to the system. An additional NT file server is added with each additional virus checker.

The utilization of the entire set of virus checkers can be approximated by computing an average number of requests across the virus checkers according to:

$$NR_{avg(i)} = \left( \sum_{j=1}^{N} NR_{ij} \right) / N$$

and then using the average response time across the virus checkers ($RT_{avg(i)}$) and the average number of requests across the virus checkers ($RT_{avg(i)}$) in the formula for utilization, according to:

$$\alpha_{avg(i)} = (RT_{avg(i)})(NR_{avg(i)})/(\tau)$$

The values of $\alpha_{avg(i)}$ for several test intervals are accumulated, and averaged across a series of adjacent test intervals, to remove irregularities. As values of the utilization are accumulated, a rate of change of the utilization between adjacent test intervals is computed, accumulated, and continually analyzed. Should the rate become exponentially increasing then an alarm is given indicating a possible problem. This is a predictive analysis function just as was done for metric entropy.

Dividing the actual utilization by the desired utilization (for example 60%) yields the factor that the number of virus checkers must be multiplied by to reach a utilization that matches the desired utilization number. A rounding function is done on the product of the utilization factor and the number of virus checkers to produce the recommended number of virus checkers to achieve a desired utilization.

The estimation technique used to determine the recommended number of virus checkers is as follows:

Call the average response rate $\mu$, the average workload $\lambda$, the desired utilization $\rho$ and the number of virus checkers servicing the load M, then the formula $$N = M(\lambda/\mu\rho)$$

gives the approximation used for the recommended number of virus checkers. In this case the average workload is in terms of a number of scans per test interval, and the average response rate, in responses per second, is the reciprocal of the computed $RT_{avg(i)}$. An example would be:

Given one virus checker being analyzed with an average workload of 10 scans per second and an average response time of 0.2 seconds per request and the desired utilization being 60% then the formula results in the desired number of virus checkers (N) being 3⅓ virus checkers. This is rounded up to 4 as the recommended number of virus checkers. If the analysis had been done on a group of 3 virus checkers, with the numbers given above, then the recommended number of virus checkers would have become 3(3⅓) or 10 virus checkers total.

The desired value of utilization is a programmable number and the value of 60% has been assumed for the virus checker examples above.

Figure 10:
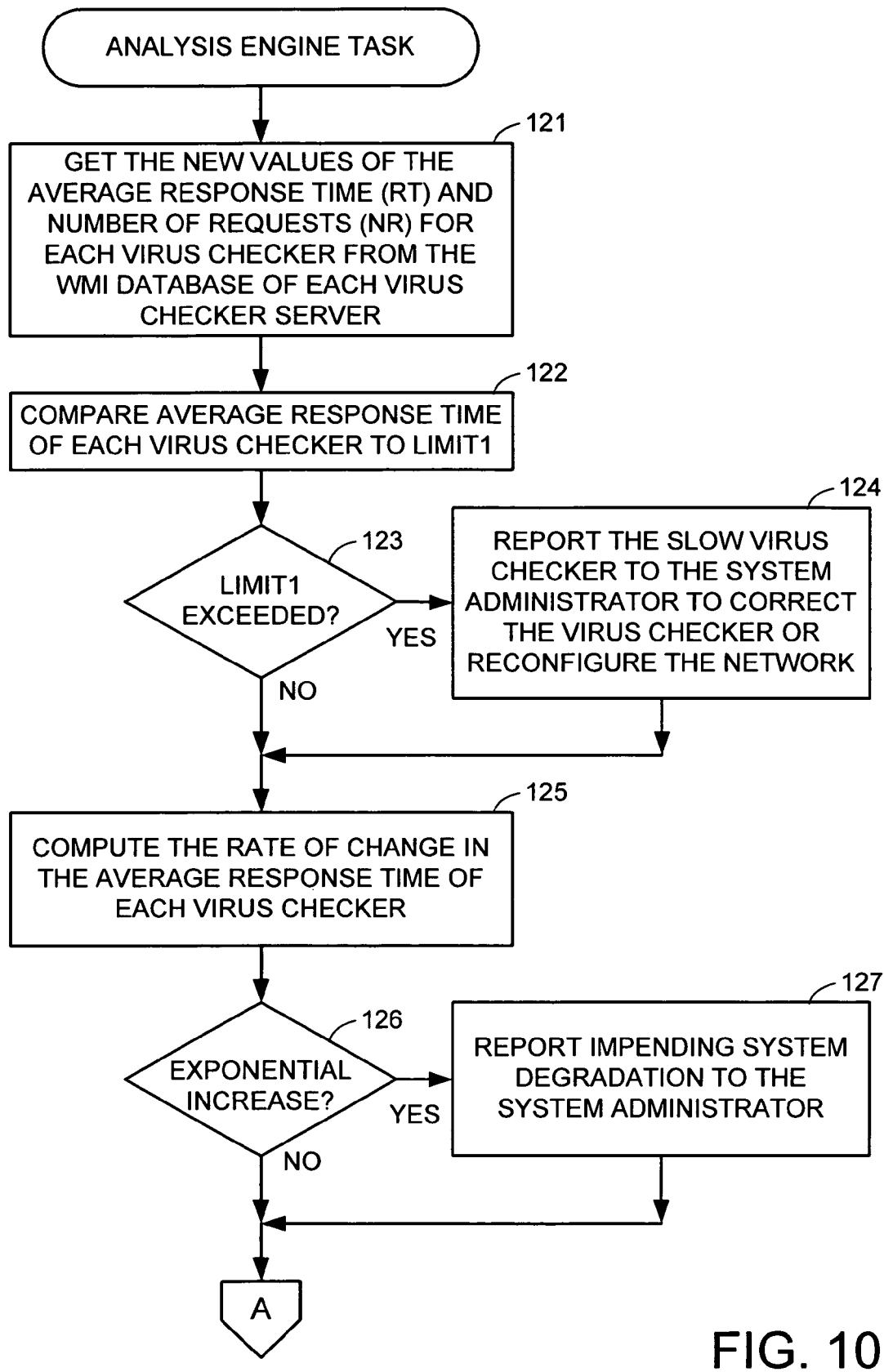
FIGS. 10 to 12 comprise a flowchart of an analysis engine task for evaluating virus checker performance statistics.
Figure 11:
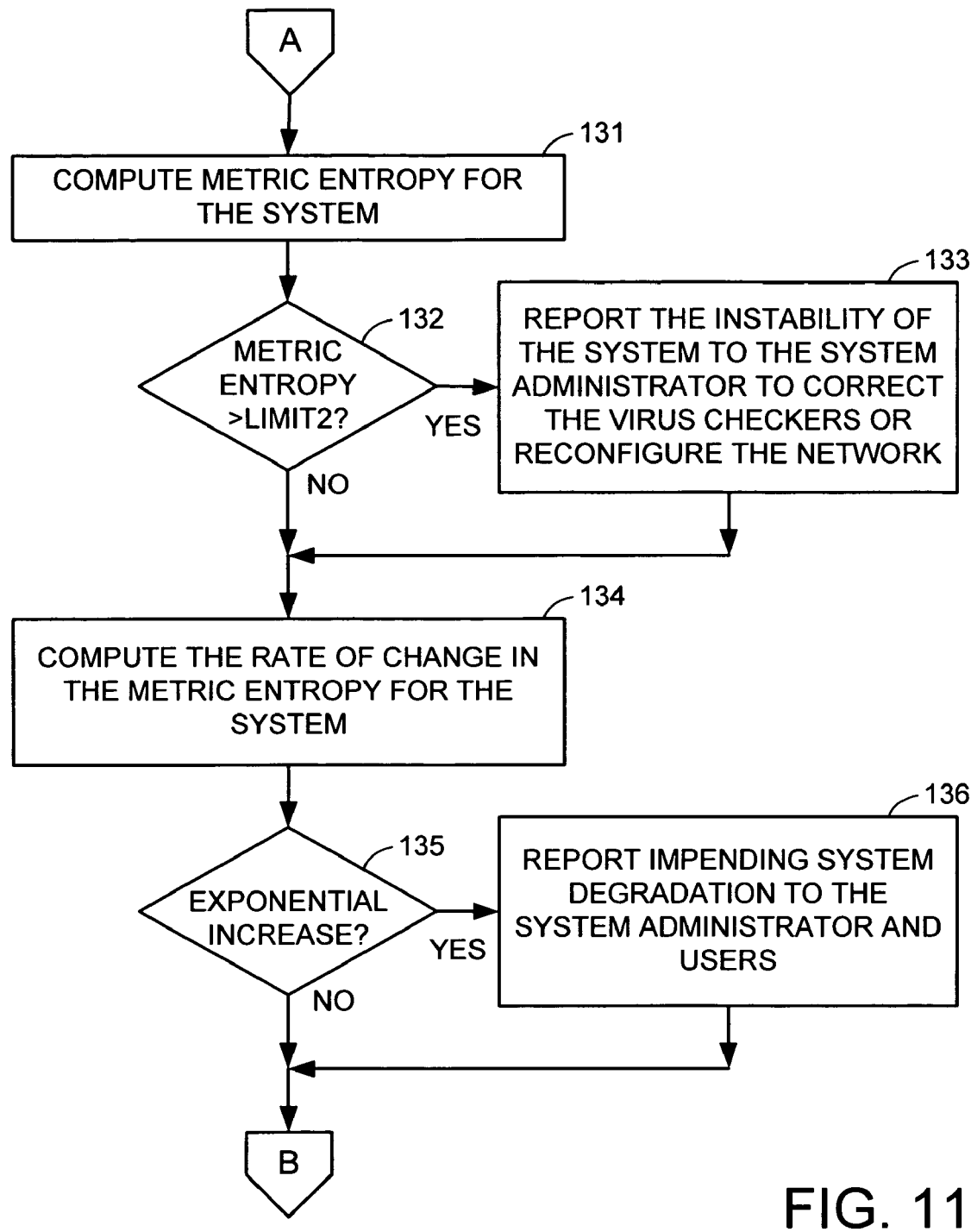
Figure 12:
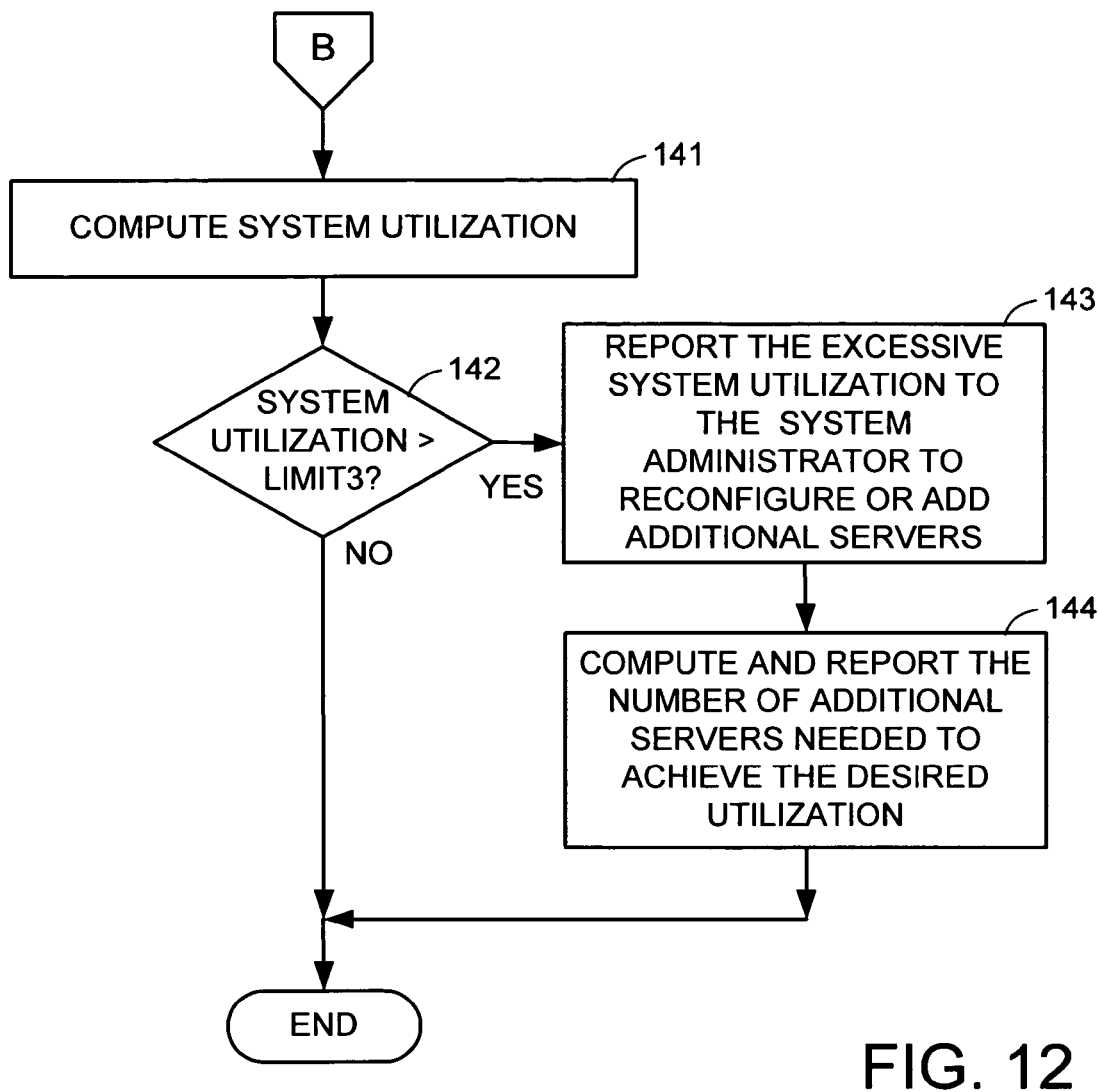

FIGS. 10 to 12 show a flowchart of an analysis engine task for performing the analysis described above. This task is performed once for each test interval. In the first step 121, the analysis engine gets the new values of the average response time (RT) and number of requests (NR) for each virus checker from the Windows Management Instrumentation (WMI) database of each virus checker server. Next, in step 122, the analysis engine compares the average response time of each virus checker to a predetermined limit (LIMIT1). If the limit is exceeded, then execution branches from step 123 to step 124 to report the slow virus checker to the system administrator to correct the virus checker or reconfigure the network. Execution continues from step 124 to step 125. If the limit is not exceeded, execution continues from step 123 to step 125.

In step 125, the analysis engine computes the rate of change in the average response time of each virus checker. In step 126, if there is an exponential increase in the average response time, then execution branches from step 126 to step 127 to report impending system degradation to the system administrator. (The detection of an exponential increase will be further described below with reference to FIG. 13.) Execution continues from step 127 to step 131 in FIG. 11. If there is not an exponential increase, execution continues from step 126 to step 131 of FIG. 11.

In step 131 of FIG. 11, the analysis engine task computes metric entropy for the system. In step 132, if the metric entropy exceeds a specified limit (LIMIT2), then execution branches to step 133 to report instability of the system to the system administrator to correct the virus checkers or reconfigure the network. Execution continues from step 133 to step 134. If the limit is not exceeded, then execution continues from step 132 to step 134.

In step 134, the analysis engine task computes the rate of change in the metric entropy for the system. In step 135, if there is an exponential increase in the metric entropy for the system, then execution branches to step 136 to report impending system degradation to the system administrator and users.

After step 136, execution continues to step 141 of FIG. 12. If there is not an exponential increase, execution continues from step 135 to step 141 of FIG. 12.

In step 141, the analysis engine computes the system utilization. In step 142, if the system utilization exceeds a specified limit (LIMIT3), then execution branches to step 143 to report the excessive system utilization to the system administrator to reconfigure the system or to add additional servers. Execution continues from step 143 to step 144. In step 144, the analysis engine task computes and reports to the system administrator the number of additional servers needed to achieve the desired utilization. After step 144, the analysis engine task is finished for the current test interval. The analysis engine task is also finished if the system utilization does not exceed the specified limit in step 142.

Figure 13:
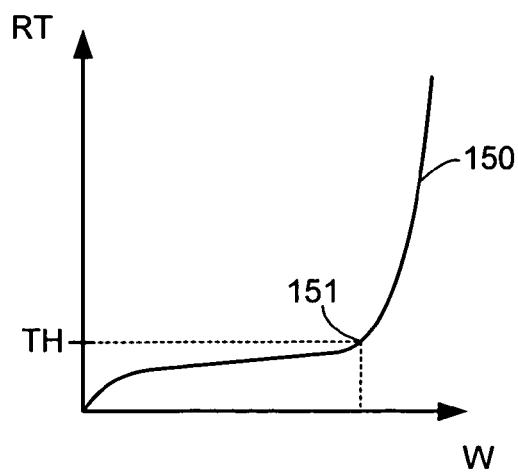
FIG. 13 shows a graph of response time as a function of server workload.

FIG. 13 shows a graph 150 of response time (RT) as a function of server workload (W). This graph exhibits a characteristic exponential increase in response time once the response time reaches a threshold (TH) at the so-called "knee" or saturation point 151 of the curve. One way of detecting the region of exponential increase is to temporarily overload the server into the exponential region in order to empirically measure the response time as a function of the workload. Once the response time as a function of workload is plotted, the knee of the curve and the threshold (TH) can be identified visually.

The knee 151 of the curve in FIG. 13 can also be located by the following computational procedure, given that the curve is defined by N workload/response time pairs (Wi, RTi) for i=1 to N. Calculating an average slope:

$$m_{avg}=(W_n-W_1)/(RT_n-RT_1);$$

and then calculate n-2 local slopes, $m_2$–$m_{n-1}$, where $$m_2=(W_3-W_1)/(RT_3-RT_1)$$

and $$m_{n-1}=(W_n-W_{n-2})/(RT_n-RT_{n-2})$$

The knee of the curve is the one of the n points, x, which satisfies each of the following conditions $m_x=m_{avg}+{-}0.5\%$; $m_{x-1}<=m_{avg}$; and $m_{x+1}>m_{avg}$.

Once the threshold is identified, operation in the exponential region can be detected by comparing the response time to the threshold (TH). In a similar fashion, it is possible to detect an exponential increase in the rate of change of the average response time or metric entropy by comparing the rate of change to a threshold indicative of entry into an exponential region. In general, the alarm limits for the measurements and performance statistics are programmable so that they can be tuned to the type of server carrying the workload.

Load Balancing of Distributed Processing Units Based on Performance Metrics

Figure 14:
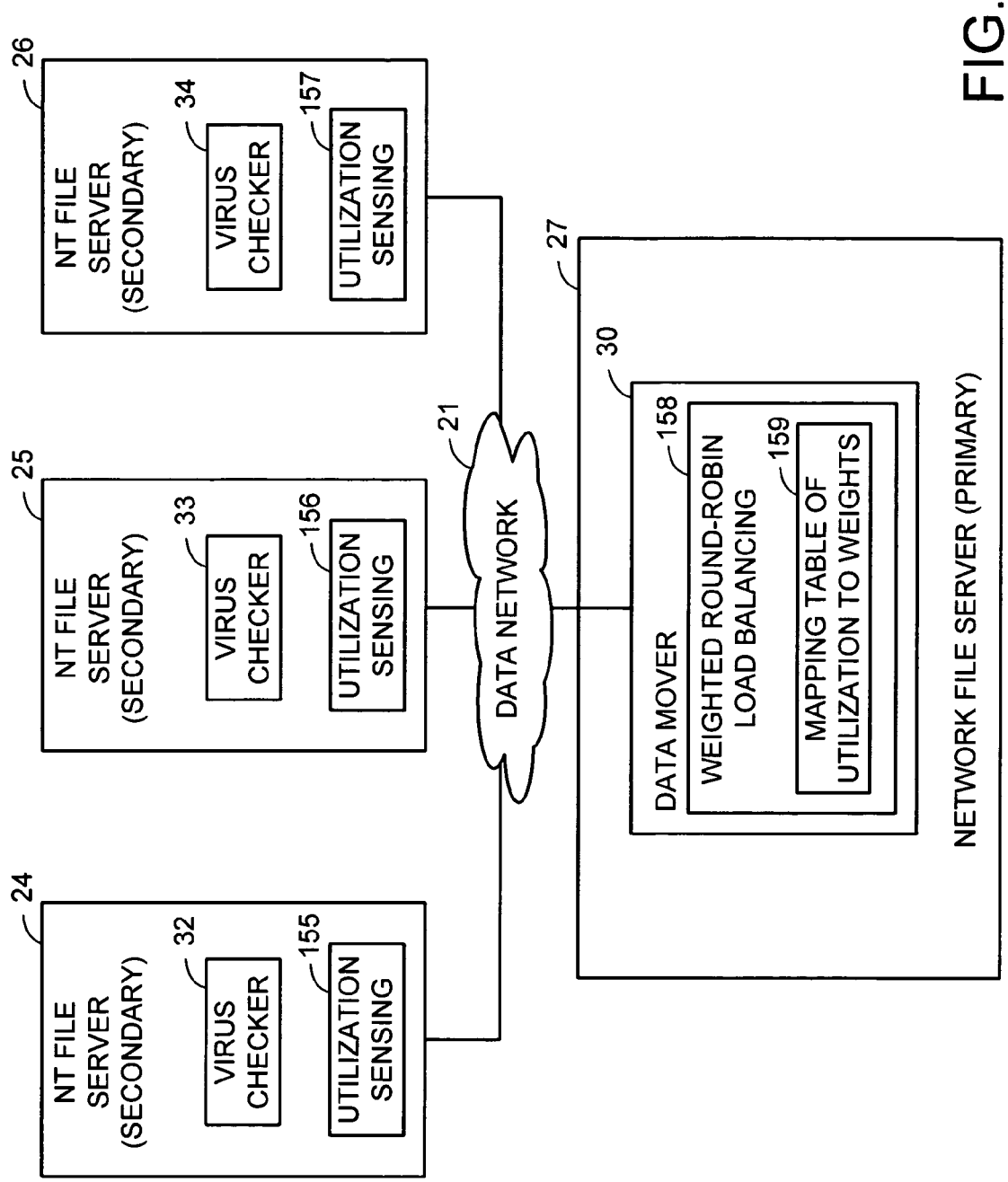
FIG. 14 is a block diagram showing load balancing components in the data processing system of FIG. 1.

It is desired to reduce the occurrence of overload of the virus checkers in the system of FIG. 1 without the cost of additional virus checkers. Each data mover can do this by performing the load balancing of step 51 in FIG. 3 based on the collected performance statistics. For example, as shown in FIG. 14, each NT file server 24, 25, 26 executes a respective program 155, 156, 157 for sensing the percentage utilization α[i] of the NT file server. This can be done as described above with reference to the event monitor and statistics generator 84 of FIG. 4. A weighted round-robin load balancing program 158 in the data mover 30 periodically collects the utilizations α[i] from the NT file servers, and accesses a mapping table 159 for converting the utilizations α[i] to a respective set of weights W[i]. The weighted round-robin load balancing program 158 uses the weights W[i] for distributing the virus scan requests to the virus checkers 32, 33, 34 in the NT file servers 24, 25, and 26.

Figure 15:
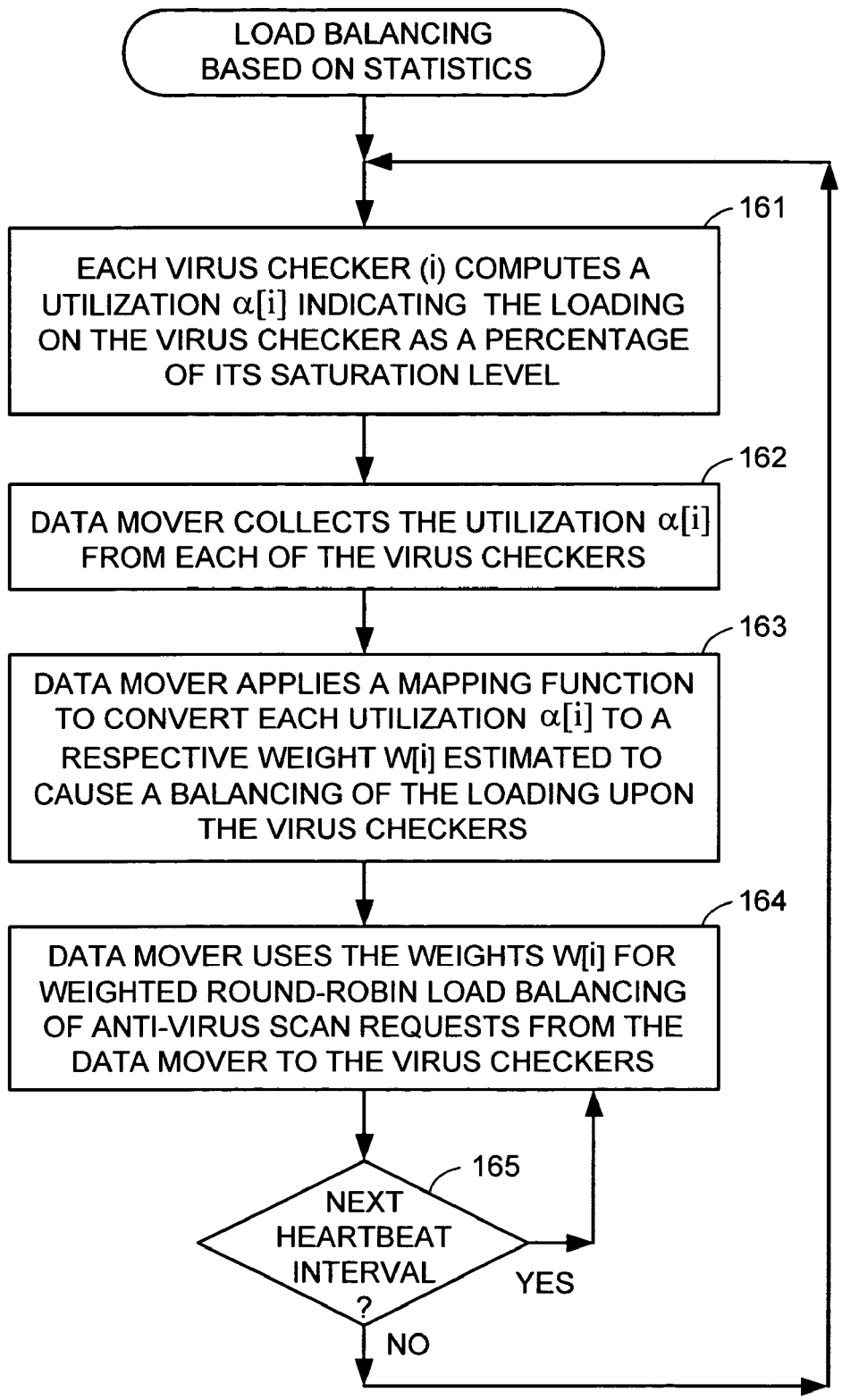
FIG. 15 is a flowchart of a basic procedure for load balancing upon the virus checkers based on the performance statistics.

FIG. 15 shows the load balancing procedure used in the system of FIG. 14. In a first step 161 of FIG. 15, each virus checker (i) computes a utilization α[i] indicating the loading on the virus checker (i) as a percentage of the saturation level of the virus checker. Next, in step 162, the data mover collects the utilization α[i] from each of the virus checkers. For example, the data mover periodically sends a heartbeat signal to the virus checkers to check the health of the virus checkers. A system administrator can program the frequency of the heartbeat signal. In response to the heartbeat signal, each virus checker calculates its scanning utilization α[i], and each virus checker returns its scanning utilization in its heartbeat response.

In step 163, the data mover applies a mapping function to convert each utilization α[i] to a respective weight W[i] estimated to cause a balancing of the loading upon the virus checkers. In other words, the weights are estimated so that if they are representative of the respective workloads placed on the virus checkers, then the utilization α[i] is expected to become substantially uniform across the virus checkers. In step 164, the data mover uses the weights W[i] for weighted round-robin load balancing of the anti-virus scan requests from the data mover to the virus checkers. In other words, the anti-virus scan requests are assigned to the virus checkers in such a way that the weights W[i] specify the respective workloads placed on the virus checkers. The weights W[i] are used for load balancing in step 164 until a next heartbeat interval occurs. In step 165, when the next heartbeat interval occurs, execution loops back to step 161.

The load balancing method of FIG. 15 can be heuristic in the sense that the estimation of the respective weights W[i] from the utilizations α[i] may take into account a number of factors that affect the performance of the virus checkers even though the effect of each factor may not be known precisely. In general, the respective weight W[i] for the virus checker (i) should vary inversely with respect to the utilization α[i] of the virus checker (i). If the virus checkers are not identical, then the respective weight is W[i] for the virus checker (i) should be proportional to the processing capability of the virus checker (i) relative to the other virus checkers.

The estimation of the respective weights W[i] should also take into consideration the fact that load balancing based on the utilization α[i] creates a feedback loop in which the open-loop gain is proportional to the incremental change in the respective weight W[i] for an incremental change in the utilization α[i] for the virus checker (i). It is possible that a relatively high open loop gain may lead to an undesired overshoot in the correction of an unbalanced condition, and at worst instability in the form of ringing or oscillation in the utilization. One would like a nearly critically damped condition in which an imbalance in the utilization over the virus checkers is corrected as much as possible in the next heartbeat interval without ringing in subsequent heartbeat intervals. Therefore, in practice, one may start with a mapping function based on known or estimated performance capabilities of the virus checkers, and then modify that mapping function based on observing how the utilization changes over a series of the heartbeat intervals in response to an imbalance in utilization.

For the case of identical virus checkers, the following mapping function has been used:

| Utilization (α) | Weight (W) |
|---|---|
| 0-40% | 4 |
| 41-60% | 3 |
| 61-90% | 2 |
| 91-100% | 1 |

The above mapping function, for example, is programmed into a table (159 in FIG. 14), so that the utilization ranges and the weights are configurable. If a system would have different types of virus checkers, for example having different processing capabilities or operating environments, a respective mapping table could be provided for each type of virus checker.

Weighted round-robin load balancing assigns virus scan requests to the virus checkers so that the frequency at which the virus checker (i) receives virus checking requests is proportional to the respective weight W[i]. Preferably the weighted round-robin load balancing achieves a result substantially similar to conventional round-robin load balancing for the case where the weights become substantially equal. This can be done in a number of ways. One such way, described below with reference to FIGS. 16-17, uses a randomization method. In the randomization method, a distribution template having W[i] entries for the virus checker (i) is created for each virus checker (i), the distribution templates are concatenated to form a distribution list, the distribution list is randomized, and then the distribution list is used to distribute the virus scan request to the virus checkers. Another such way, described below with reference to FIG. 18, uses a deterministic method in which each virus checker (i) has an accumulator incremented by its respective weight W[i] each time a request is assigned to a virus checker. The request is assigned to the virus checker having a maximum accumulated value, and then the accumulator for this virus checker is decremented by the sum of all the weights.

Figure 16:
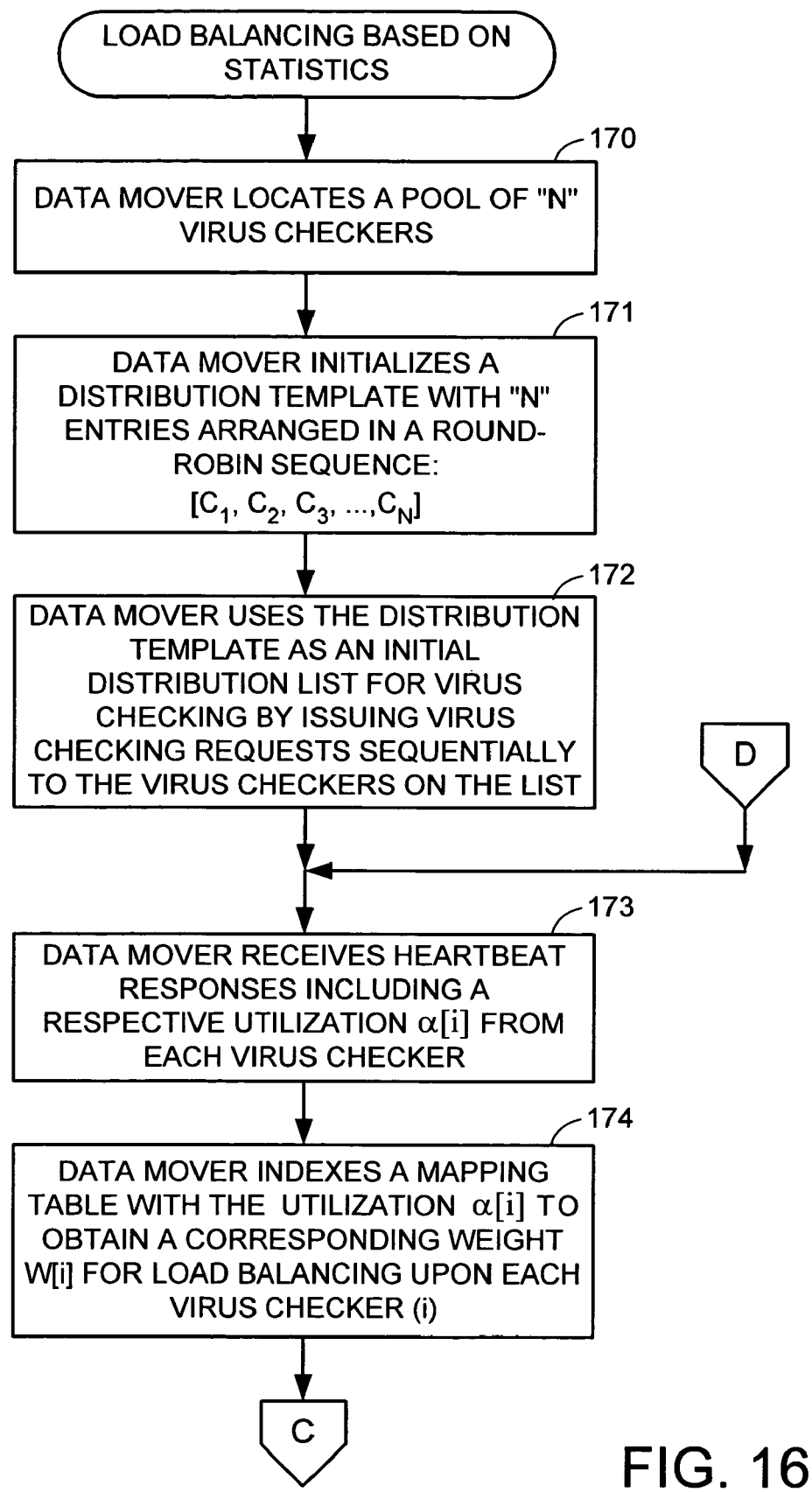
FIGS. 16 and 17 comprise a flowchart of a first implementation of basic procedure in FIG. 14, in which a distribution list for weighted round-robin load balancing is obtained by a randomization method.
Figure 17:
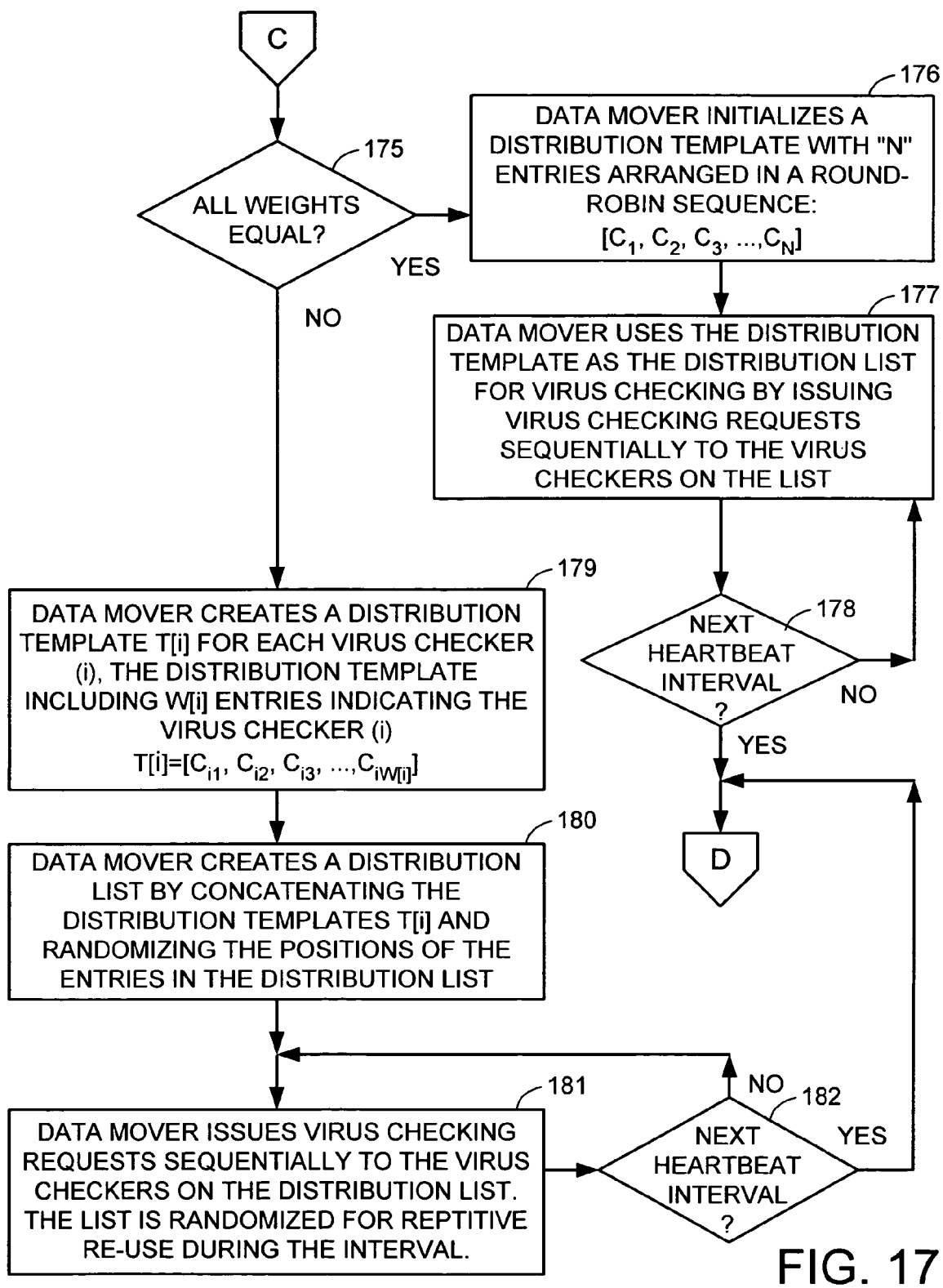

FIGS. 16-17 shows how a data mover may perform load balancing based on statistics using the randomization method of round-robin load balancing. In a first step 170, the data mover locates a pool of "N" virus checkers. Next, in step 171, the data mover initializes a distribution template with "N" entries arranged in a round-robin sequence; i.e., $[C_1, C_2, C_3, \ldots, C_N]$, there $C_i$ denotes an entry in the distribution template indicating the ith virus checker. In step 172, the data mover uses the distribution template as an initial distribution list for virus checking by issuing virus checking requests sequentially to the virus checkers on the distribution list. This initial distribution list is used until in step 173, the data mover receives heartbeat responses including a respective utilization α[i] from each virus checker. In step 174, the data mover indexes the mapping table with each utilization α[i] to obtain a corresponding weight W[i] for load balancing upon each virus checker (i). Execution continues from step 174 of FIG. 16 to step 175 of FIG. 17.

In step 175 of FIG. 17, if all of the weights are equal, then execution branches to step 176. In step 176, the data mover initializes a distribution template with "N" entries arranged in a round-robin sequence; i.e., $[C_1, C_2, C_3, \ldots, C_N]$. Then in step 177, the data mover uses the distribution template as the distribution list for virus checking by issuing virus checking requests sequentially to the virus checkers on the list. This distribution list is used for issuing virus checking requests until the next heartbeat interval. When the next heartbeat interval occurs, execution loops back from step 178 to step 173 in FIG. 16.

In step 175 of FIG. 16, if all of the weights W[i] are not equal, then execution continues from step 175 to step 179. In step 179, the data mover creates a distribution template T[i] for each virus checker (i). The distribution template includes W[i] entries indicating the virus checker (i); i.e., $T[i]=[C_{i1}, C_{i2}, C_{i3}, \ldots, C_{iW[i]}]$. Then in step 180, the data mover creates a distribution list by concatenating the distribution templates T[i] and randomizing the positions of the entries in the distribution list.

For example, suppose that there are four virus checkers $C_1$, $C_2$, $C_3$, $C_4$. The first virus checker $C_1$ has a weight W[1]=1, the second virus checker $C_2$ has a weight W[2]=2, the third virus checker $C_3$ has a weight W[3]=3, and the fourth virus checker $C_4$ has a weight W[4]=4. Then the distribution templates are $T[1]=[C_1]$, $T[2]=[C_2, C_2]$, $T[3]=[C_3, C_3, C_3,]$, and $T[4]=[C_4, C_4, C_4, C_4]$. The d concatenated to form the distribution list $[C_1, C_2, C_2, C_3, C_3, C_3, C_4, C_4, C_4, C_4]$. The distribution list can have at most N* MAXWEIGHT entries, where N is the number of virus checkers, and MAXWEIGHT is the maximum weight.) The distribution list is randomized, for example, to produce $[C_4, C_3, C_4, C_2, C_3, C_1, C_4, C_2, C_4, C_3]$. Randomization of the distribution list avoids pattern overloading that otherwise would be caused by repetitive use of the distribution templates over the interval.

In order to randomize the distribution list, the number of entries in the distribution list (N) is obtained. Then, for each entry (i) in the list, a number RND(i) between 1 and N is selected by a pseudo-random number generator function, and the (ith) entry is swapped with the RND(i)th entry in the list.

From step 180, execution continues to step 181. In step 181, the data mover issues virus checking requests sequentially to the virus checkers on the distribution is list. When the end of the distribution list is reached, the data mover re-randomizes the distribution list, and then issue virus checking requests sequentially to the virus checkers beginning at the start of the newly randomized distribution list. Randomization of the distribution list for repetitive re-use during the heartbeat interval avoids pattern overloading of the virus checkers. When the next heartbeat interval occurs, execution loops back from step 182 to step 173 in FIG. 16.

Figure 18:
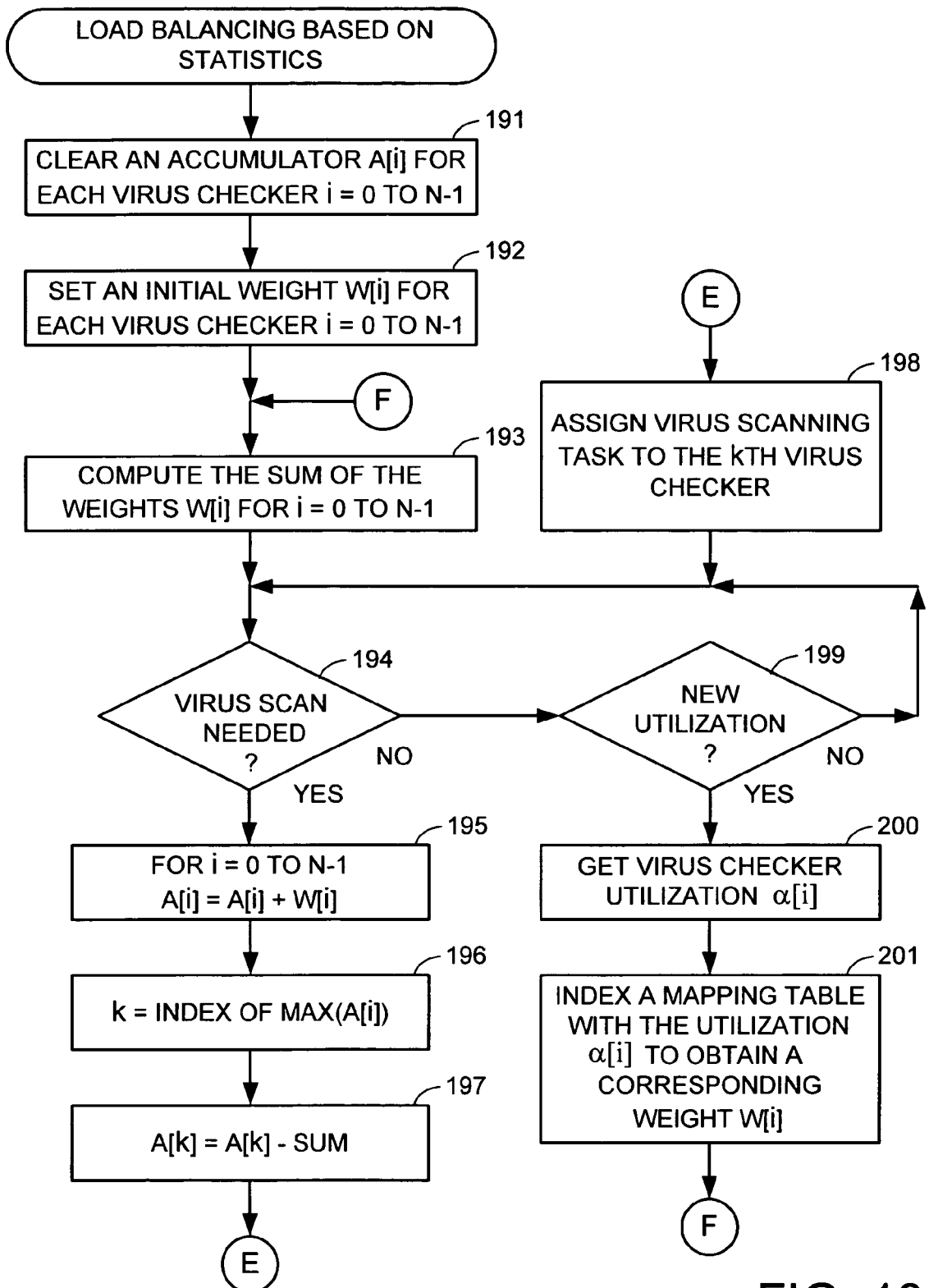
FIG. 18 is a flowchart of a second implementation of the basic procedure in FIG. 14, in which weighted round-robin load balancing is performed by a deterministic method.

FIG. 18 shows the alternative load balancing routine that uses an accumulator A[i] for each virus checker for performing the weighted round-robin load balancing. In a first step 191, the data mover clears a respective accumulator A[i] for each of the N virus checkers (i=0 to N-1). In step 192, the data mover sets an initial weight W[i] for each virus checker. For example, for the case where the weights in the mapping table range from 1 to 4, the initial weight is a mean or median value such as 2. In step 193, the data mover computes the sum of the weights W[i] for all of the virus checkers i=0 to N-1. In step 194, if a virus scan is needed, then execution continues to step 195. In step 195, the accumulator A[i] for each virus checker is incremented by the respective weight for the virus checker.

In step 196, the data mover finds the index (k) of an accumulator having a maximum accumulated value. For example, the index (k) of the accumulator having a maximum accumulated value is found by the following procedure:

```
k = 0;
maxa = A[0];
if (N = 1) then return;
for (i = 1 to N-1) {
```

-continued

```
        if (A[i] > maxa) then {
            k = i;
            maxa = A[i];
        }
    }
```

In step 197, the kth accumulator A[k] is decremented by the sum of the weights (from step 193). In step 198, the virus scanning task is assigned to the kth virus checker, and then execution loops back to step 194.

In step 194, if a virus scan is not needed, then execution branches to step 199. In step 199, unless a virus checker reports a new utilization, execution loops back to step 194. Otherwise, when a virus checker reports a new utilization, execution continues to step 200. In step 200, the data mover gets the new virus checker utilization α[i]. In step 201, the data mover indexes a mapping table with the new utilization α[i] to obtain a corresponding weight W[i]. From step 201, execution loops back to step 193 to re-compute the sum of the weights.

In the load balancing procedure of FIG. 18, when a virus scan is needed, the accumulator for each virus checker is incremented by its respective weight in step 195, the virus checker having the maximum accumulator value is selected in step 196, and the accumulator of the selected virus checker is decremented by the sum of the weights in step 197. Therefore, the frequency of selecting each virus checker becomes proportional to its respective weight.

In view of the above, there has been described a method of reducing system overload conditions without the cost of additional processing units in a distributed data processing system. Performance parameters are obtained for the distributed processing units. The performance parameters include a utilization value of each distributed processing unit. Respective weights are obtained for the distributed processing units by applying a mapping function to the utilization values. The respective weights are used for weighted round-robin load balancing of work requests upon the distributed processing units. In one implementation, a set of utilization values of the distributed processing units is collected in response to a periodic heartbeat signal, a set of weights are produced from the set of utilization values, a distribution list is produced from the set of weights, and the distribution list is randomized repetitively for re-use during the heartbeat interval. In another implementation, an accumulator is maintained for each distributed processing unit, and when a work request needs to be assigned, the accumulator for each distributed processing unit is incremented by its respective weight, a distributed processing unit having a maximum accumulator value is selected, and the accumulator of the selected processing unit is decremented by the sum of the weights.

What is claimed is:

1. In a data processing network including distributed processing units, a method comprising:
    a processor executing computer instructions to perform the steps of:
    obtaining a respective utilization value of each distributed processing unit;
    applying a function to the respective utilization value of said each distributed processing unit to obtain a respective weight for said each distributed processing unit; and
    using the respective weights for the distributed processing units for distributing work requests to the distributed processing units so that the respective weight for said each distributed processing unit specifies a respective frequency at which the work requests are distributed to said each distributed processing unit;
    wherein the respective weight for said each distributed processing unit is programmed into a mapping table, and the function is applied to the respective utilization value of said each distributed processing unit to obtain the respective weight for said each distributed processing unit by indexing the mapping table with the respective utilization value of said each distributed processing unit to obtain the respective weight for said each distributed processing unit.

2. In a data processing network including distributed processing units, a method comprising:
    a processor executing computer instructions to perform the steps of:
    obtaining a respective utilization value of each distributed processing unit;
    applying a function to the respective utilization value of said each distributed processing unit to obtain a respective weight for said each distributed processing unit; and
    using the respective weights for the distributed processing units for distributing work requests to the distributed processing units so that the respective weight for said each distributed processing unit specifies a respective frequency at which the work requests are distributed to said each distributed processing unit;
    wherein the respective weights for the distributed processing units are used for distributing work requests to the distributed processing units by creating a distribution list containing entries indicating the distributed processing units, the respective weight for said each distributed processing unit specifying the number of the entries indicating said each distributed processing unit, and by randomizing the distribution list, and accessing the randomized distribution list for distributing the work requests to the distributed processing units as indicated by the entries in the randomized distribution list, and re-randomizing the distribution list for re-use once the end of the distribution list is reached during the distribution of the work requests to the distributed processing units as indicated by the entries in the randomized distribution list.

3. In a data processing network including a network file server and a plurality of virus checking servers, a method comprising:
    the network file server obtaining a respective utilization value of each virus checking server, the respective utilization value of said each virus checking server indicating a percentage of saturation of said each virus checking server;
    the network file server applying a function to the respective utilization value of said each virus checking server to obtain a respective weight for said each virus checking server; and
    the network file server using the respective weights for the virus checking servers for weighted round-robin load balancing of virus checking requests from the network file server to the virus checking servers;
    wherein the respective weight for said each virus checking server is programmed into a mapping table, and the network file server indexes the mapping table with said each respective utilization value to obtain the respective weight for said each virus checking server.

4. In a data processing network including a network file server and a plurality of virus checking servers, a method comprising:

the network file server obtaining a respective utilization value of each virus checking server, the respective utilization value of said each virus checking server indicating a percentage of saturation of said each virus checking server;

the network file server applying a function to the respective utilization value of said each virus checking server to obtain a respective weight for said each virus checking server; and the network file server using the respective weights for the virus checking servers for weighted round-robin load balancing of virus checking requests from the network file server to the virus checking servers;

wherein the respective weights for the virus checking servers are used for weighted round-robin load balancing of virus checking requests from the network file server to the virus checking servers by creating a distribution list containing entries indicating the virus checking servers, the respective weight for said each virus checking server specifying the number of the entries indicating said each virus checking server, and by randomizing the distribution list, and accessing the randomized distribution list for distributing the virus checking requests from the network file server to the virus checking servers as indicated by the entries in the randomized distribution list, and re-randomizing the distribution list for re-use once the end of the distribution list is reached during the distributing of the work requests to the virus checking servers as indicated by the entries in the randomized distribution list.

5. In a data processing network including a network file server and a plurality of virus checking servers, a method comprising:

the network file server obtaining a respective utilization value of each virus checking server, the respective utilization value of said each virus checking server indicating a percentage of saturation of said each virus checking server;

the network file server applying a function to the respective utilization value of said each virus checking server to obtain a respective weight for said each virus checking server; and the network file server using the respective weights for the virus checking servers for weighted round-robin load balancing of virus checking requests from the network file server to the virus checking servers;

wherein the respective weights for the virus checking servers are used for weighted round-robin load balancing of virus checking requests from the network file server to the virus checking servers by creating a distribution list containing entries indicating the virus checking servers, the respective weight for said each virus checking server specifying the number of the entries indicating said each virus checking server, and by randomizing the distribution list, and accessing the randomized distribution list for distributing the virus checking requests from the network file server to the virus checking servers as indicated by the entries in the randomized distribution list, and wherein the network file server obtains the utilization values of the virus checking servers at the start of a heartbeat interval, randomizes the distribution list repetitively during use of the distribution list for load balancing of virus checking requests during the heartbeat interval, obtains new utilization values of the virus checking servers at the start of a following heartbeat interval, and produces a new distribution list from the new utilization values of the virus checking servers for load balancing of virus checking requests during the following heartbeat interval.

6. A data processing system comprising distributed processing units and a memory storing computer instructions and a processor coupled to the distributed processing units for distributing work requests to the distributed processing units, the computer instructions, when executed by the processor performing the steps of:

obtaining a respective utilization value of each distributed processing unit;

applying a function to the respective utilization value of said each distributed processing unit to obtain a respective weight for said each distributed processing unit; and using the respective weights for the distributed processing units for distributing work requests to the distributed processing units so that the respective weight for said each distributed processing unit specifies a respective frequency at which the work requests are distributed to said each distributed processing unit;

wherein the respective weight for said each distributed processing unit is programmed into a mapping table, and the processor is programmed to apply the function to the respective utilization value of said each distributed processing unit to obtain a respective weight for said each distributed processing unit by indexing the mapping table with said each respective utilization value of said each distributed processing unit to obtain the respective weight for said each distributed processing unit.

7. A data processing system comprising distributed processing units and a memory storing computer instructions and a processor coupled to the distributed processing units for distributing work requests to the distributed processing units, the computer instructions, when executed by the processor performing the steps of:

obtaining a respective utilization value of each distributed processing unit;

applying a function to the respective utilization value of said each distributed processing unit to obtain a respective weight for said each distributed processing unit; and using the respective weights for the distributed processing units for distributing work requests to the distributed processing units so that the respective weight for said each distributed processing unit specifies a respective frequency at which the work requests are distributed to said each distributed processing unit;

wherein the processor is programmed for using the respective weights for the distributed processing units for distributing work requests to the distributed processing units by creating a distribution list containing entries indicating the distributed processing units, the respective weight for said each distributed processing unit specifying the number of the entries indicating said each distributed processing unit, and by randomizing the distribution list, and accessing the randomized distribution list for distributing the work requests to the distributed processing units as indicated by the entries in the randomized distribution list, and re-randomizing the distribution list for re-use once the end of the distribution list is reached during the distribution of the work requests to the distributed processing units as indicated by the entries in the randomized distribution list.

8. A data processing system comprising virus checking servers and a network file server coupled to the virus checking servers for distributing virus checking requests to the virus checking servers, the network file server having a memory storing computer instructions and a processor, the computer instructions when executed by the processor, performing the steps of:

obtaining a respective utilization value of each virus checking server, the respective utilization value of said each virus checking server indicating a percentage of saturation of said each virus checking server;

applying a function to the respective utilization value of said each virus checking server to obtain a respective weight for said each virus checking server; and using the respective weights for the virus checking servers for weighted round-robin load balancing of virus checking requests from the network file server to the virus checking servers;

wherein the respective weight for said each virus checking server is programmed into a mapping table, and the network file server is programmed for indexing the mapping table with said each respective utilization value of said each virus checking server to obtain the respective weight for said each virus checking server.

9. A data processing system comprising virus checking servers and a network file server coupled to the virus checking servers for distributing virus checking requests to the virus checking servers, the network file server having a memory storing computer instructions and a processor, the computer instructions when executed by the processor, performing the steps of:

obtaining a respective utilization value of each virus checking server, the respective utilization value of said each virus checking server indicating a percentage of saturation of said each virus checking server;

applying a function to the respective utilization value of said each virus checking server to obtain a respective weight for said each virus checking server; and using the respective weights for the virus checking servers for weighted round-robin load balancing of virus checking requests from the network file server to the virus checking servers; and wherein the network file server is programmed for using the respective weights for the virus checking servers for weighted round-robin load balancing of virus checking requests from the network file server to the virus checking servers by creating a distribution list containing entries indicating the virus checking servers, the respective weight for said each virus checking server specifying the number of the entries indicating said each virus checking server, and by randomizing the distribution list, and accessing the randomized distribution list for distributing the virus checking requests from the network file server to the virus checking servers as indicated by the entries in the randomized distribution list, and re-randomizing the distribution list for re-use once the end of the distribution list is reached during the distributing of the work requests to the virus checking servers as indicated by the entries in the randomized distribution list.

10. A data processing system comprising virus checking servers and a network file server coupled to the virus checking servers for distributing virus checking requests to the virus checking servers, the network file server having a memory storing computer instructions and a processor, the computer instructions when executed by the processor, performing the steps of:

obtaining a respective utilization value of each virus checking server, the respective utilization value of said each virus checking server indicating a percentage of saturation of said each virus checking server;

applying a function to the respective utilization value of said each virus checking server to obtain a respective weight for said each virus checking server; and using the respective weights for the virus checking servers for weighted round-robin load balancing of virus checking requests from the network file server to the virus checking servers; and wherein the network file server is programmed for using the respective weights for the virus checking servers for weighted round-robin load balancing of virus checking requests from the network file server to the virus checking servers by creating a distribution list containing entries indicating the virus checking servers, the respective weight for said each virus checking server specifying the number of the entries indicating said each virus checking server, and by randomizing the distribution list, and accessing the randomized distribution list for distributing the virus checking requests from the network file server to the virus checking servers as indicated by the entries in the randomized distribution list, and wherein the network file server is programmed for collecting utilization statistics from the virus checking servers at the start of a heartbeat interval, for randomizing the distribution list repetitively during use of the distribution list for load balancing of virus checking requests during the heartbeat interval, for collecting a new set of utilization statistics from the virus checking servers at the start of a following heartbeat interval, and for producing a new distribution list from the new set of utilization statistics for load balancing of virus checking requests during the following heartbeat interval.

* * * * *